United States Patent
Koike et al.

(10) Patent No.: US 8,194,929 B2
(45) Date of Patent: Jun. 5, 2012

(54) POSITION/ATTITUDE RECOGNIZING METHOD, PART HOLDING METHOD, PART ARRANGING METHOD, PART ASSEMBLING METHOD, POSITION/ATTITUDE RECOGNIZING APPARATUS, PART HOLDING APPARATUS, PART ARRANGING APPARATUS AND PART ASSEMBLING APPARATUS

(75) Inventors: Naoki Koike, Ebina (JP); Kimihiro Wakabayashi, Ebina (JP); Hiroyuki Hotta, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 534 days.

(21) Appl. No.: 12/543,163

(22) Filed: Aug. 18, 2009

(65) Prior Publication Data
US 2010/0246895 A1  Sep. 30, 2010

(30) Foreign Application Priority Data
Mar. 25, 2009  (JP) .................... 2009-074378

(51) Int. Cl.
*G06K 9/00* (2006.01)
*G01C 3/08* (2006.01)

(52) U.S. Cl. .................... 382/106; 382/274; 356/4.1

(58) Field of Classification Search ............ 382/100, 382/106–108, 140–143, 154, 162, 168, 173, 382/181, 191–199, 209, 219–224, 232, 254, 382/274, 276, 285–291, 305, 312, 321; 348/86; 700/245; 347/242; 356/498, 615, 4.1
See application file for complete search history.

(56) References Cited

U.S. PATENT DOCUMENTS

| | | | |
|---|---|---|---|
| 5,640,241 A * | 6/1997 | Ogawa .................. | 356/615 |
| 6,985,236 B2 * | 1/2006 | Seko et al. ............. | 356/498 |
| 7,061,518 B2 * | 6/2006 | Ueda et al. ............ | 347/242 |
| 2003/0078694 A1 * | 4/2003 | Watanabe et al. ...... | 700/245 |
| 2004/0051880 A1 | 3/2004 | Seko et al. | |
| 2005/0102060 A1 * | 5/2005 | Watanabe et al. ...... | 700/245 |
| 2010/0245558 A1 * | 9/2010 | Koike et al. ............ | 348/86 |

FOREIGN PATENT DOCUMENTS

| | | |
|---|---|---|
| JP | 05-301183 | 11/1993 |
| JP | 11-156764 | 6/1999 |
| JP | 2004-212328 | 7/2004 |
| JP | 2005-055244 | 3/2005 |
| JP | 2005-138223 | 6/2005 |
| JP | 2008-070343 | 3/2008 |

* cited by examiner

*Primary Examiner* — Seyed Azarian
(74) *Attorney, Agent, or Firm* — Morgan, Lewis & Bockius LLP

(57) ABSTRACT

A group of light spots dispersed and disposed three-dimensionally to be disposed not in one plane on an object-to-be-measured are shot by a camera. A position and an attitude of the object-to-be-measured are recognized based on an optical image representing each of the light spots included on a shot image by the camera.

20 Claims, 36 Drawing Sheets

POSITION/ATTITUDE RECOGNIZING METHOD, PART HOLDING METHOD, PART ARRANGING METHOD, PART ASSEMBLING METHOD, POSITION/ATTITUDE RECOGNIZING APPARATUS, PART HOLDING APPARATUS, PART ARRANGING APPARATUS AND PART ASSEMBLING APPARATUS

CROSS-REFERENCE TO RELATED APPLICATION

This application is based on and claims priority under U.S.C. 119 from Japanese Patent Application No. 2009-074378, filed on Mar. 25, 2009.

SUMMARY

According to an aspect of the invention, a position/attitude recognizing method includes:

a first shooting process of shooting, by a camera, a group of light spots on an object-to-be-measured on which the group of light spots are arranged, the group of light spots including a plural light spots which are dispersed and disposed three-dimensionally to be disposed not on one plane; and a first recognizing process of recognizing a position and an attitude of the object-to-be-measured based on an optical image representing each of the plural light spots included in the group of light spots on a first shot image obtained by the shooting in the first shooting process.

Figure 4:
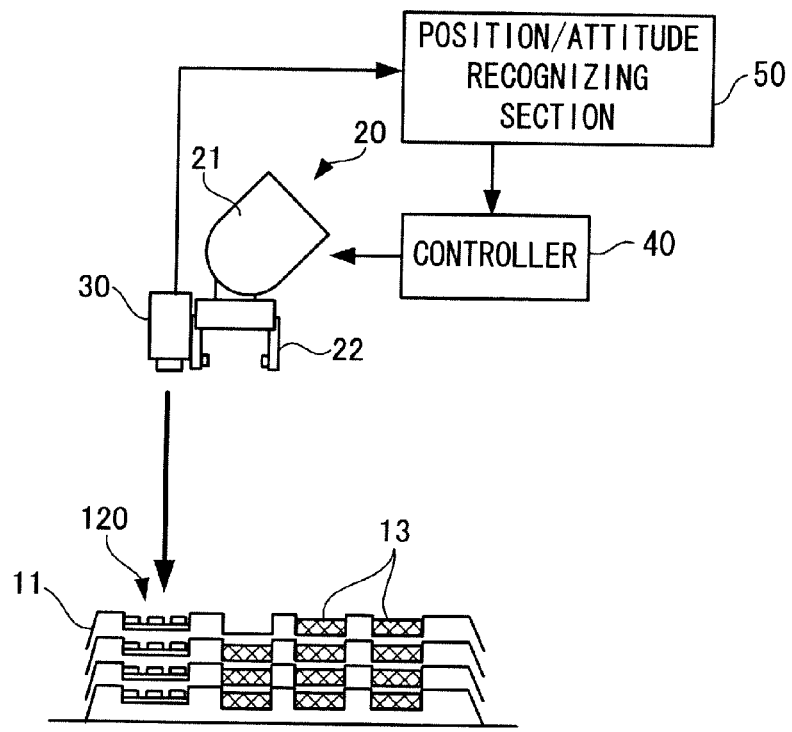
FIG. 4 illustrates processes of a part holding method as a first exemplary embodiment of the present invention.
Figure 5:
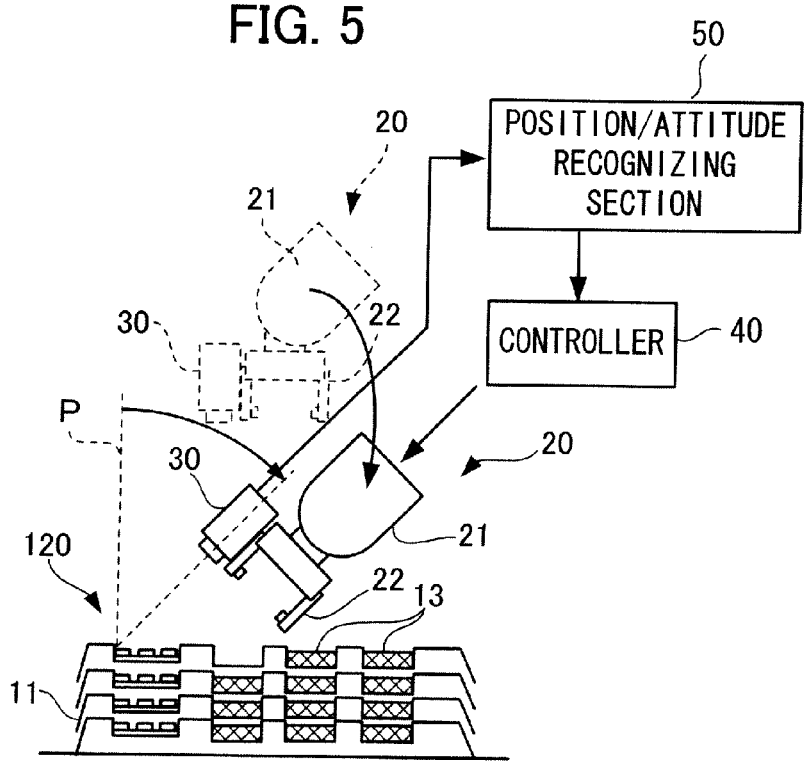
FIG. 5 illustrates processes of a part holding method as a first exemplary embodiment of the present invention.
Figure 6:
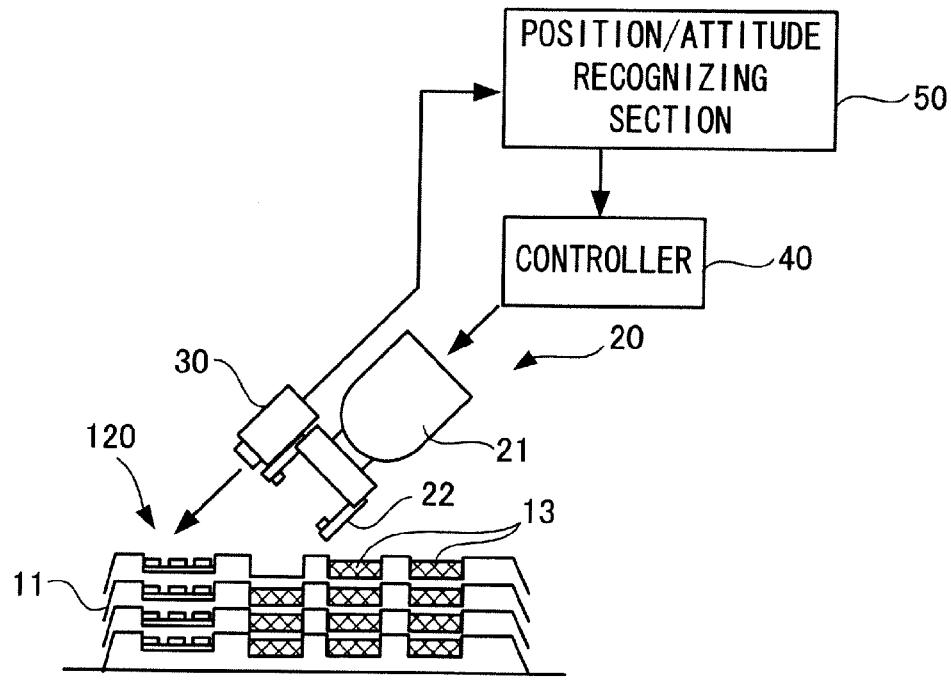
FIG. 6 illustrates processes of a part holding method as a first exemplary embodiment of the present invention.
Figure 7:
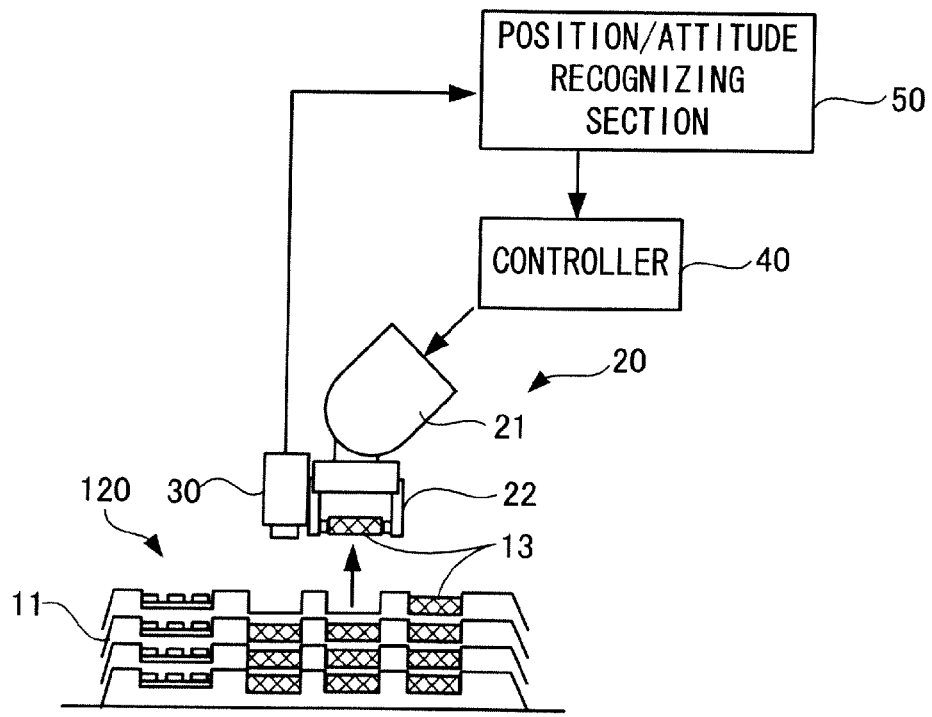
FIG. 7 illustrates processes of a part holding method as a first exemplary embodiment of the present invention.
Figure 11:
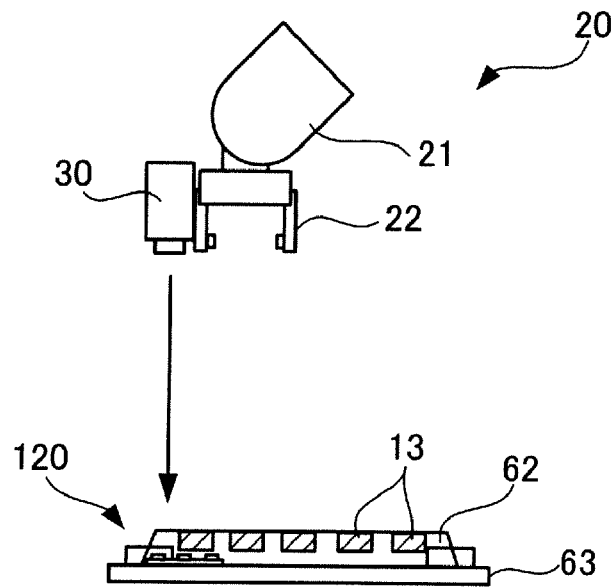
Figure 12:
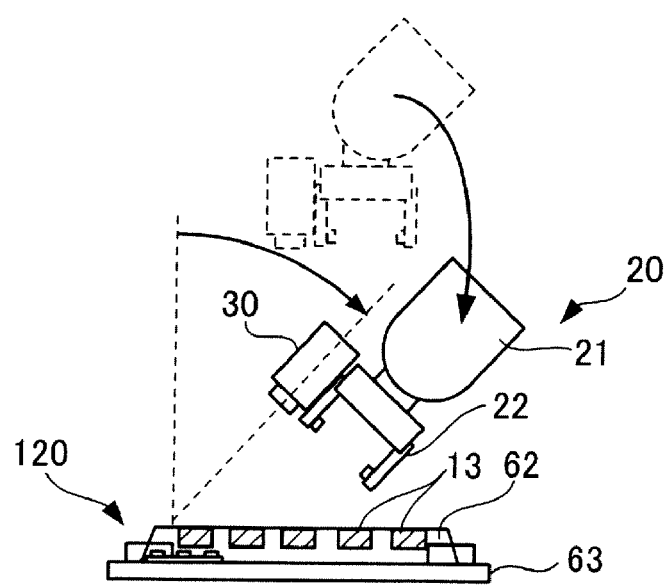
Figure 13:
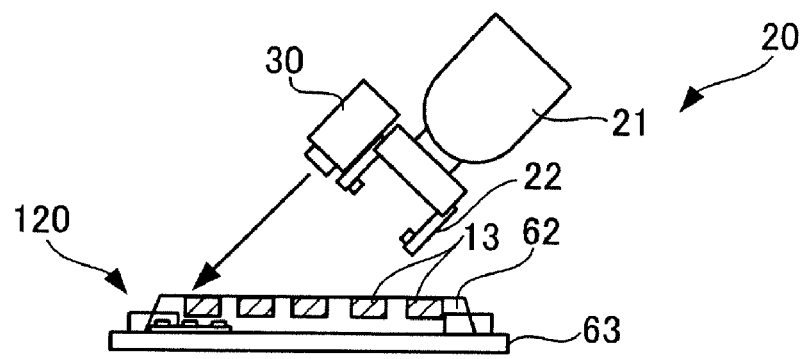
Figure 14:
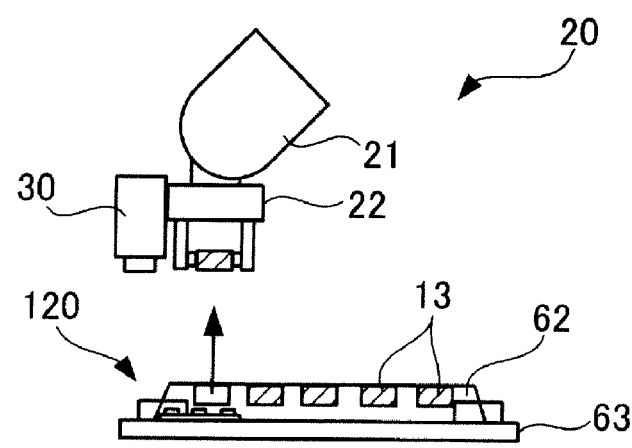
Figure 15:
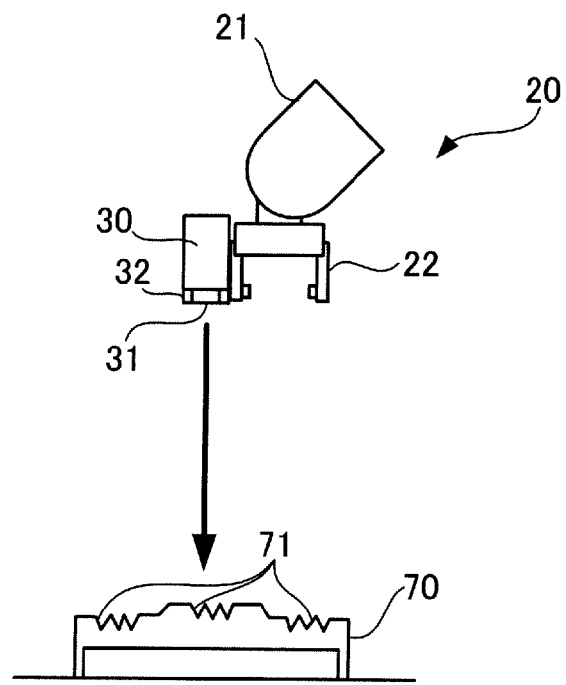
Figure 16:
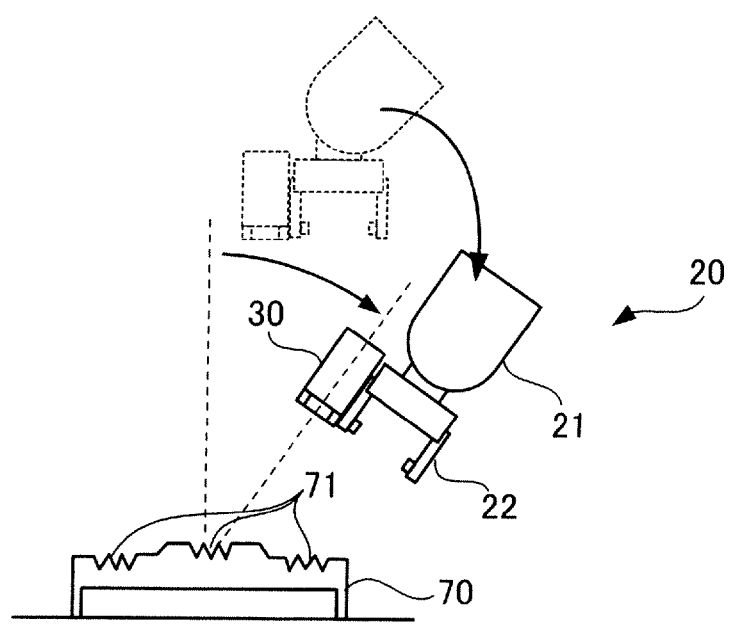
Figure 17:
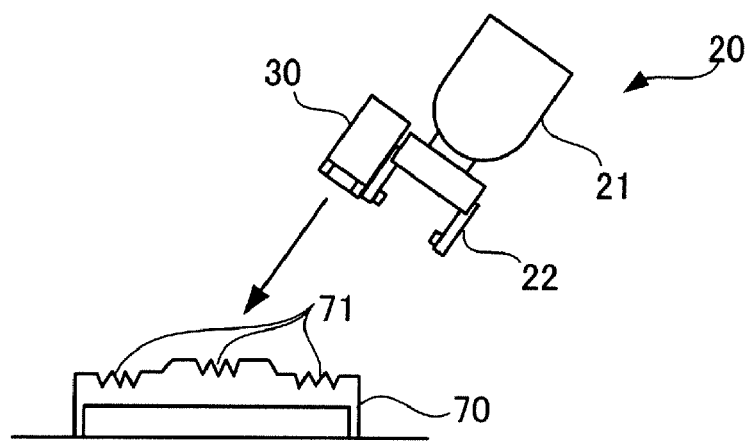
Figure 18:
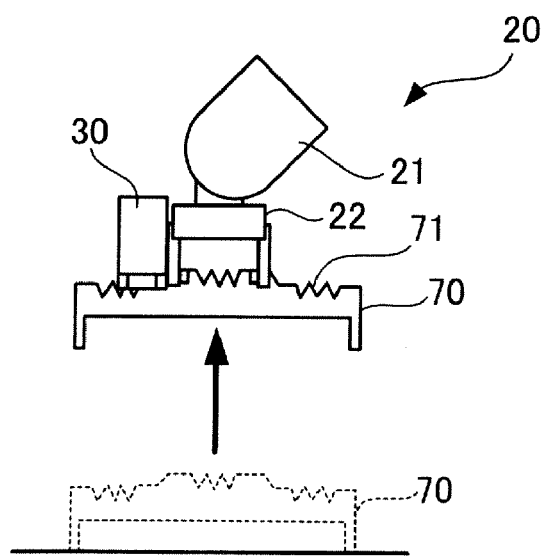
Figure 19:
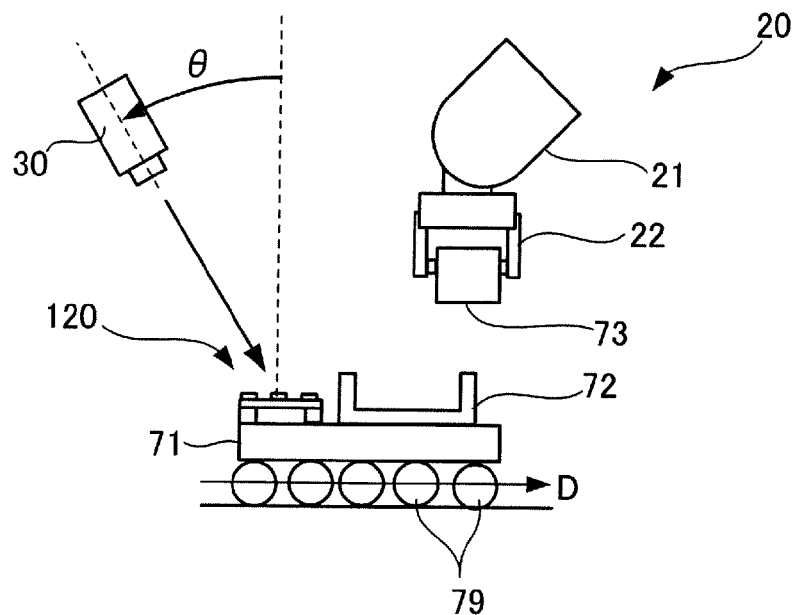
Figure 20:
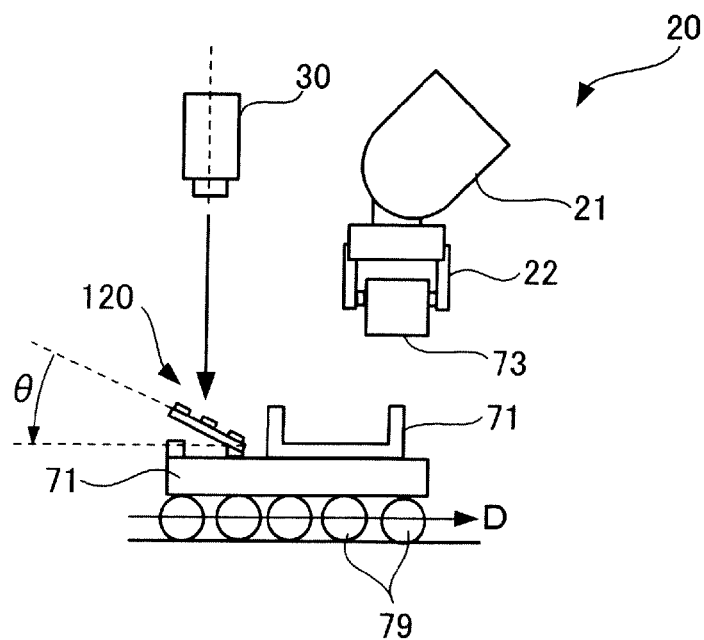
Figure 21:
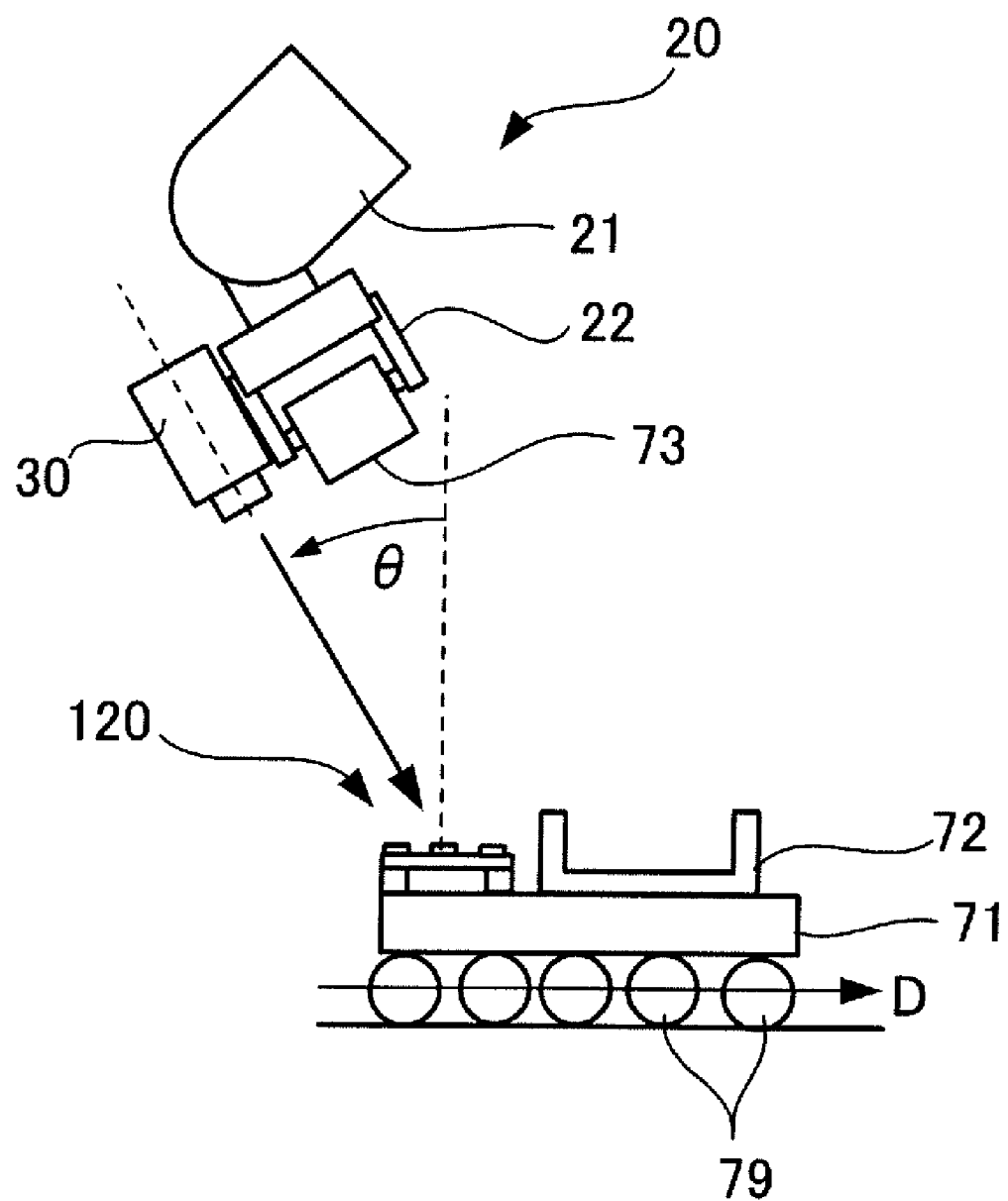
Figure 22:
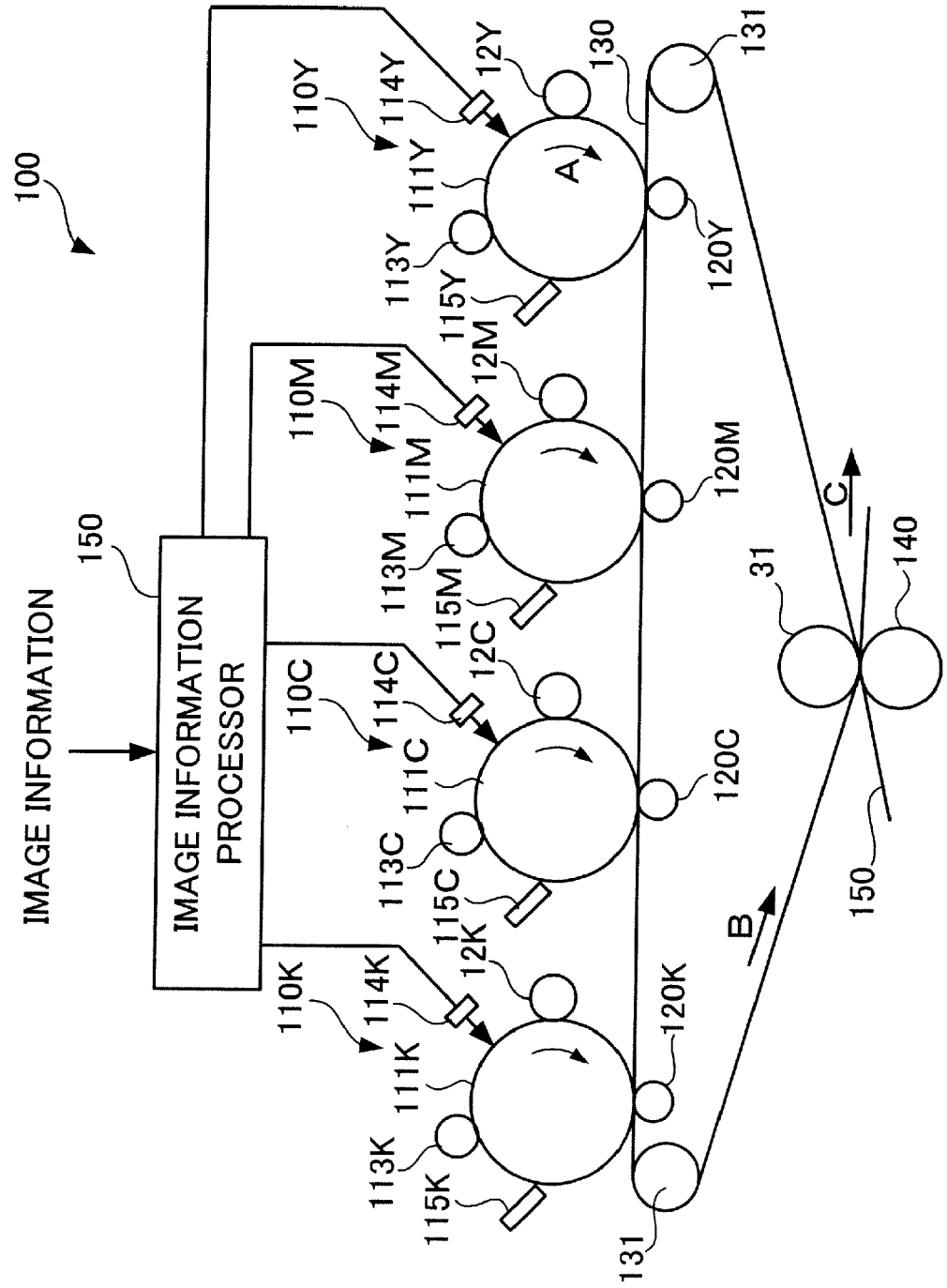
Figure 23:
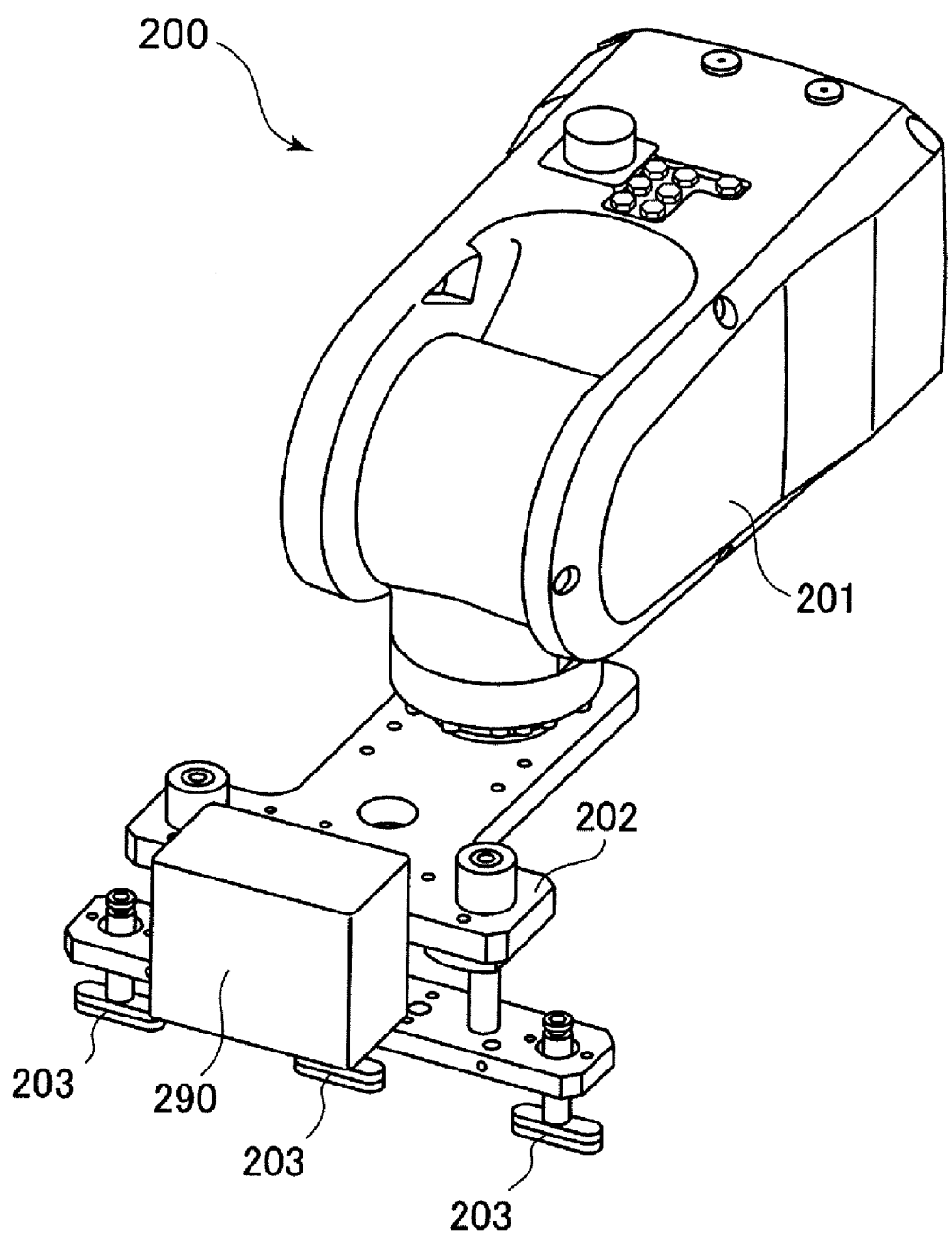
Figure 24:
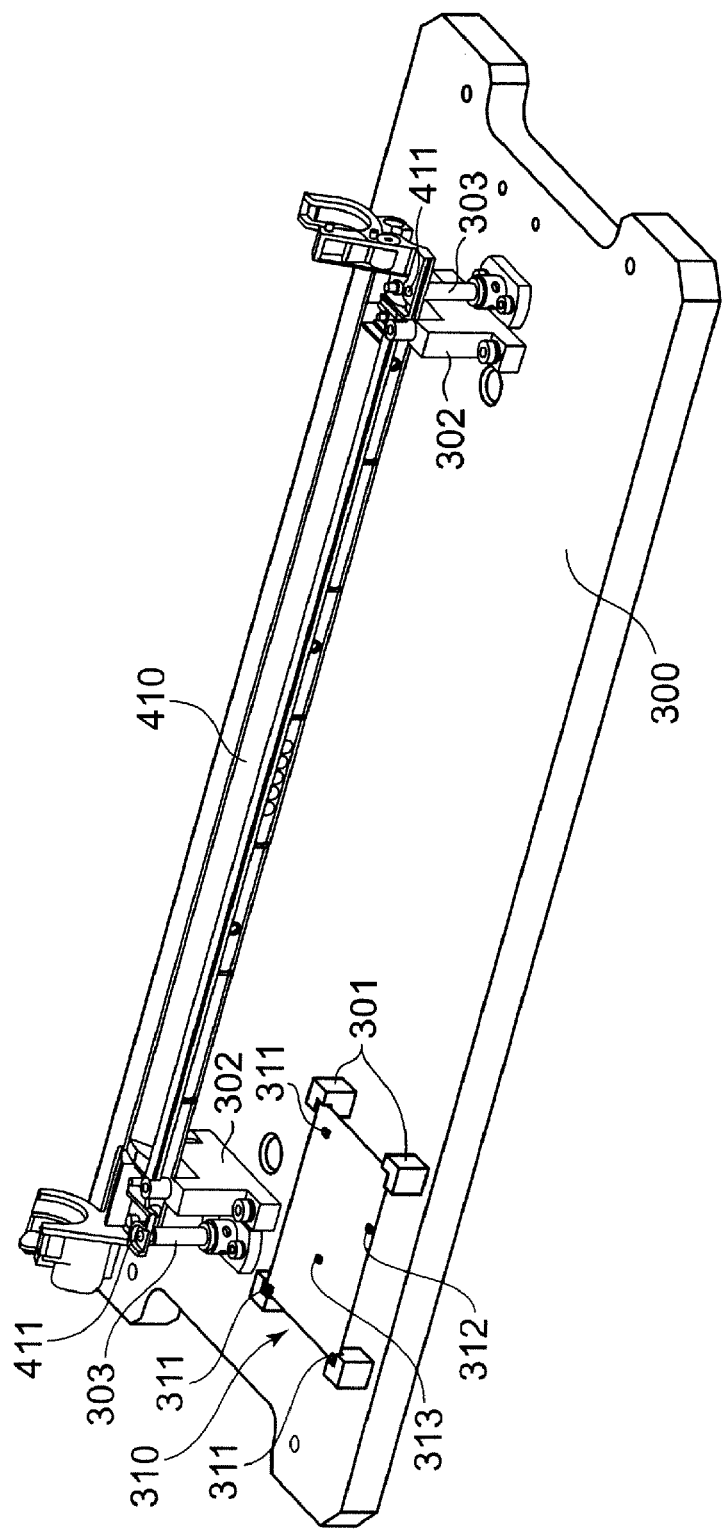
Figure 25:
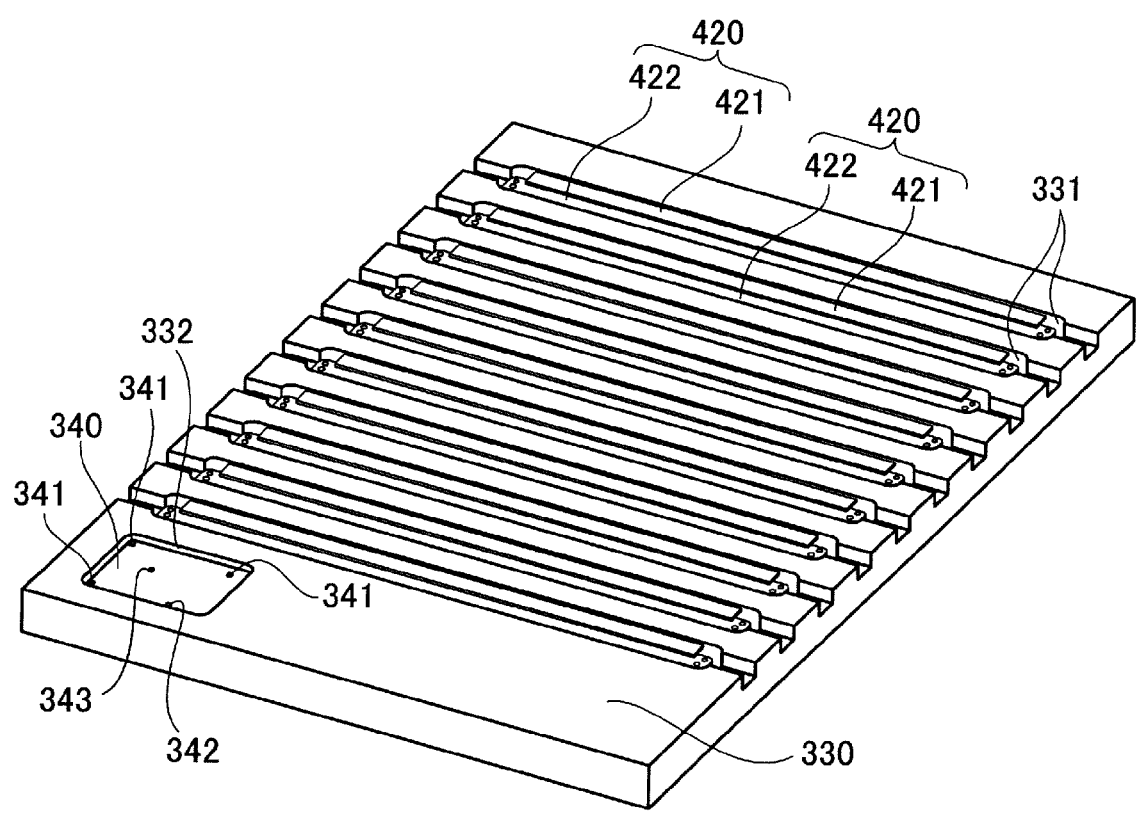
Figure 26:
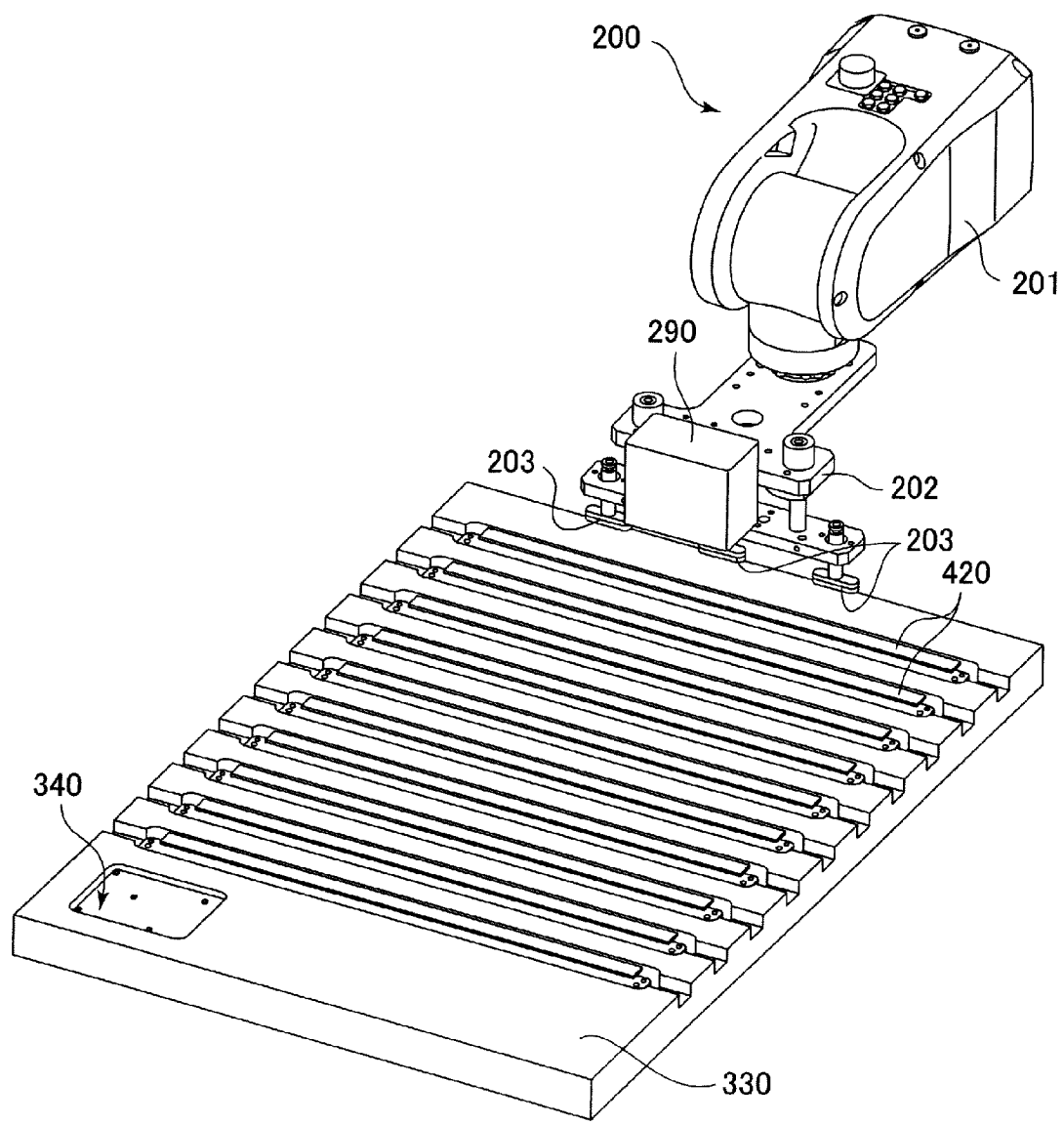
Figure 27:
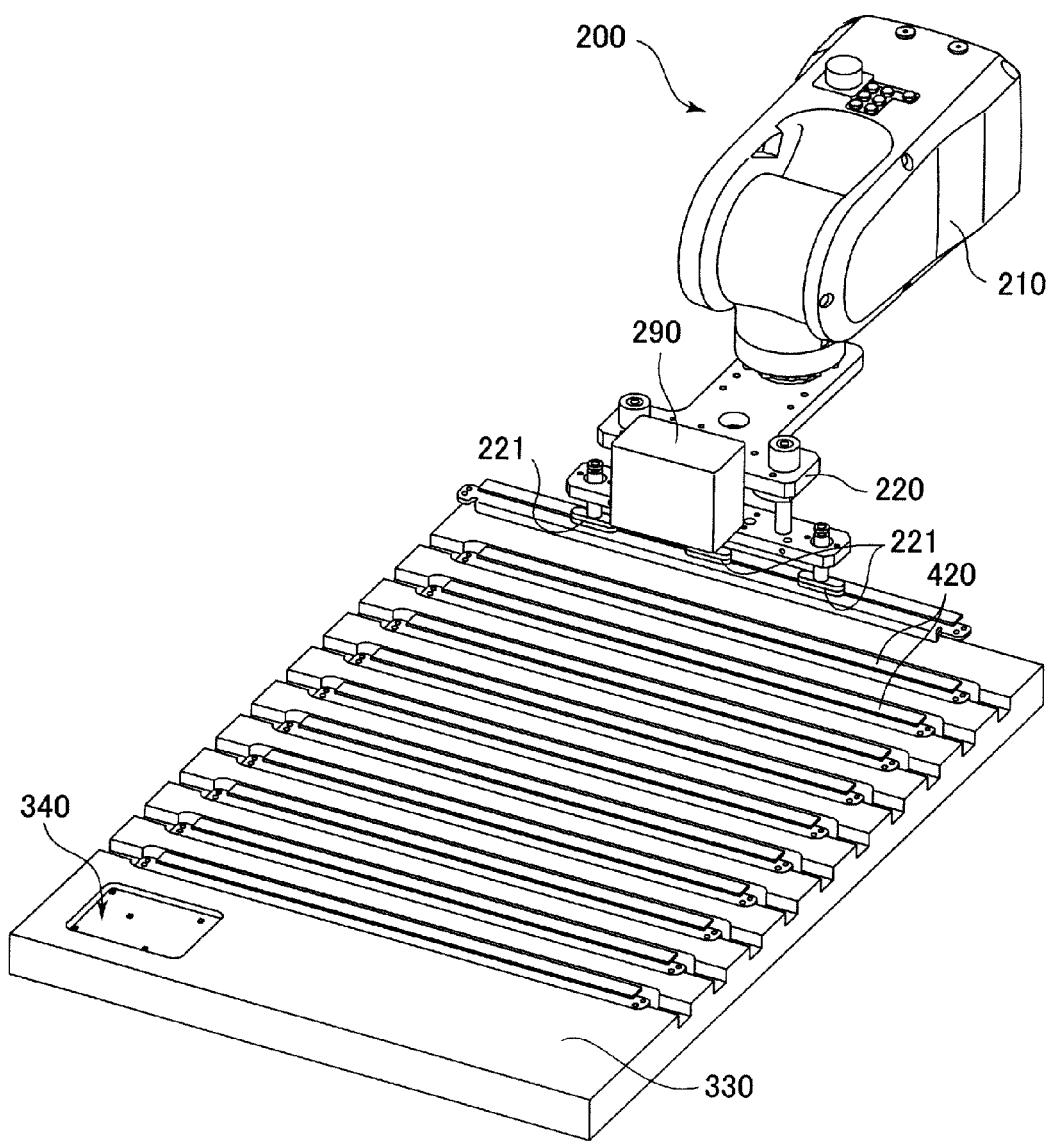
Figure 28:
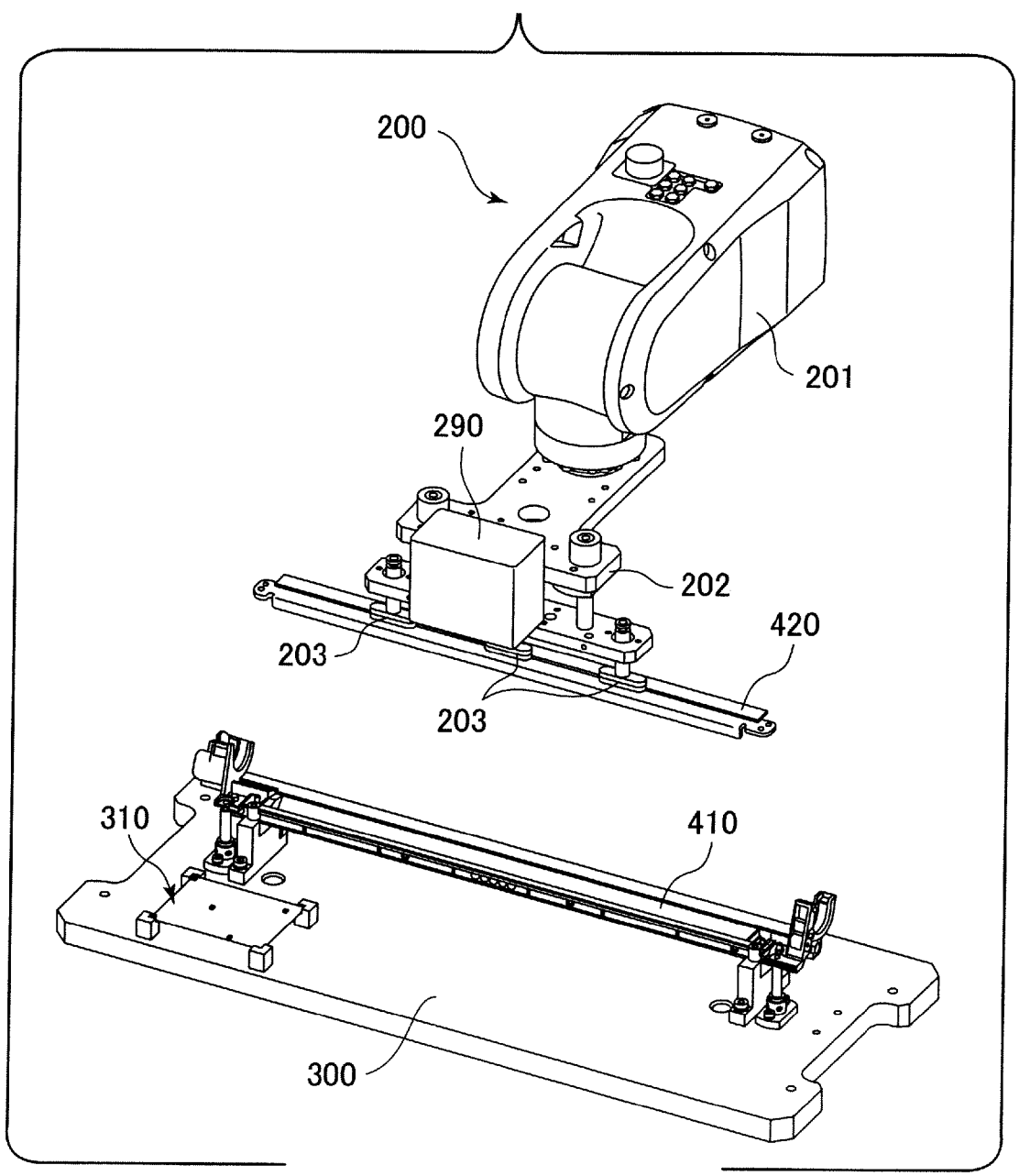
Figure 29:
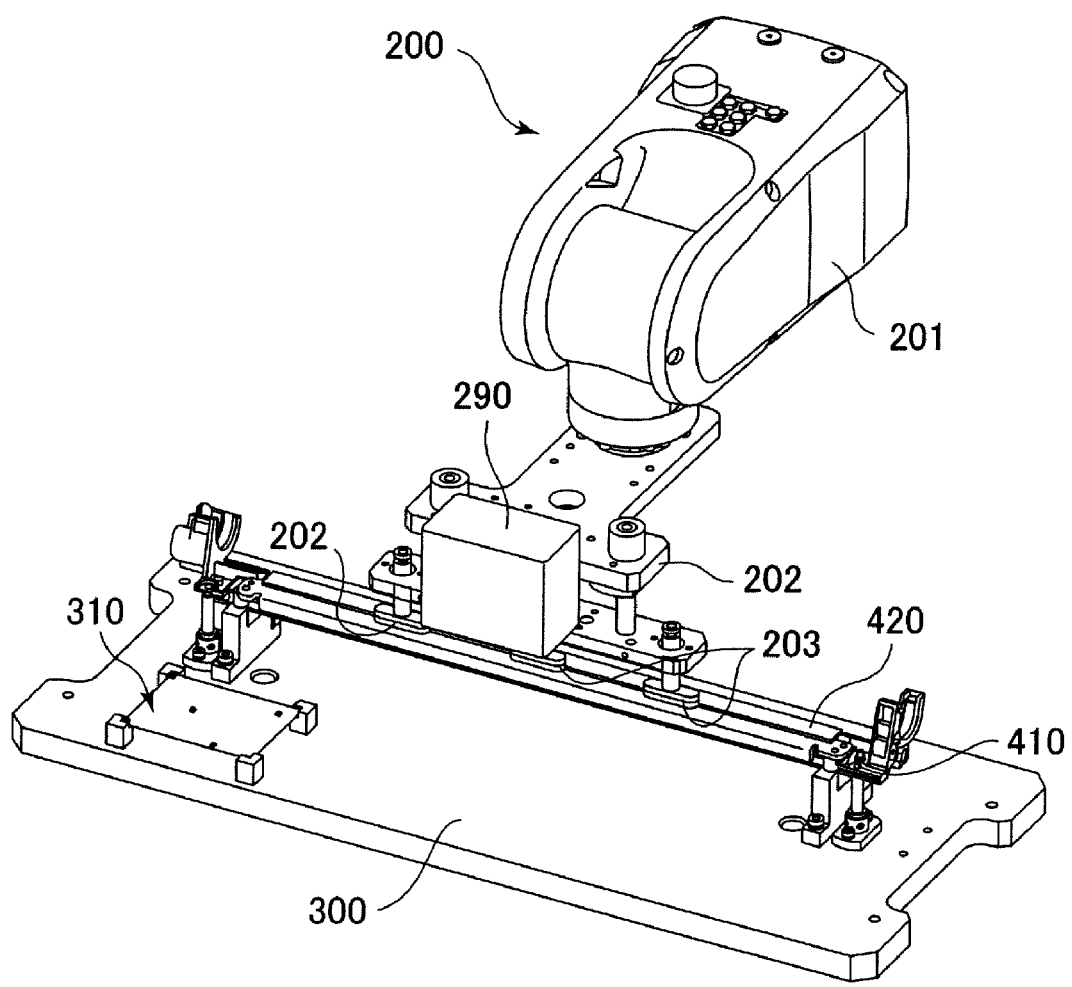
Figure 30:
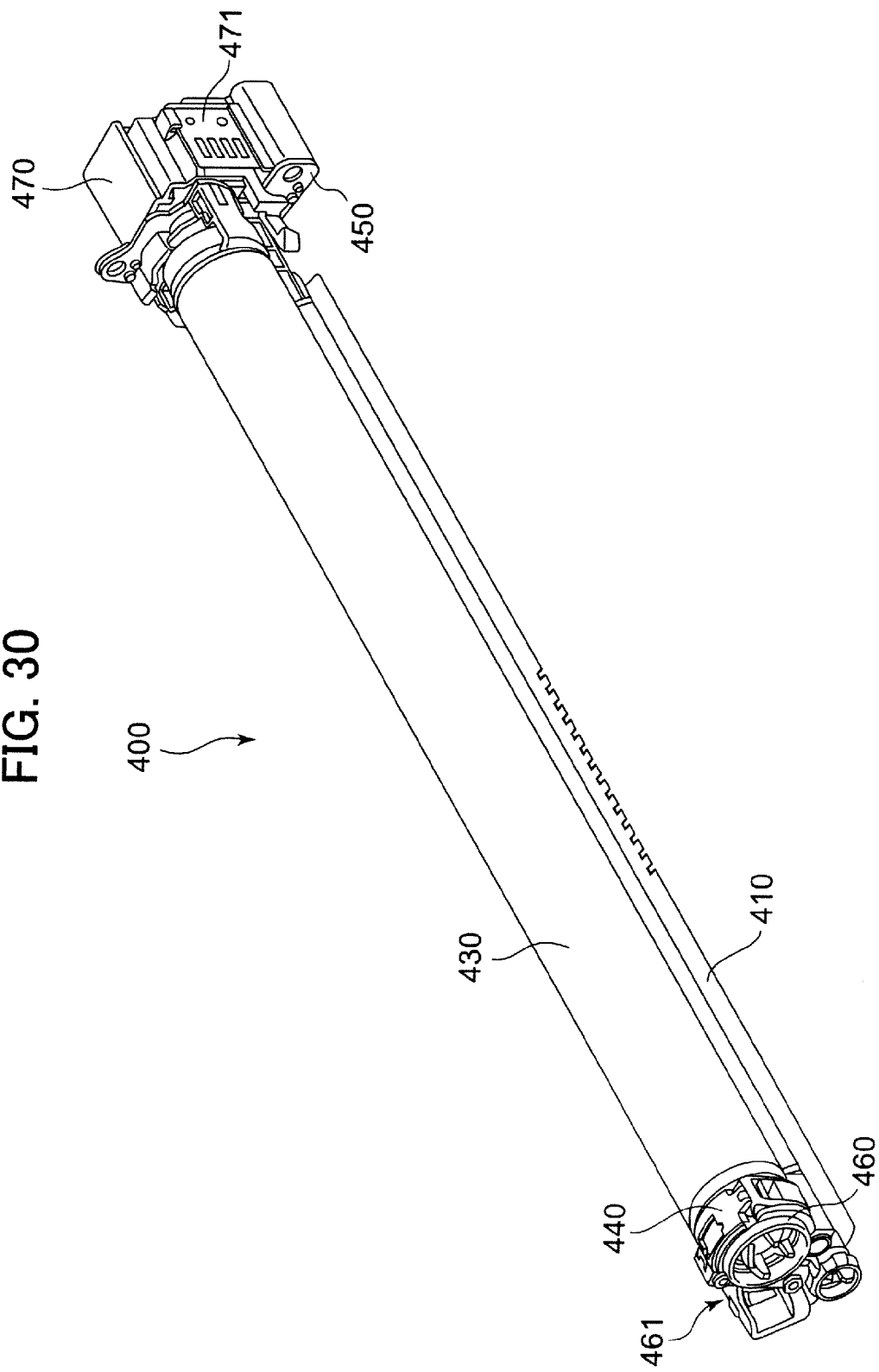
Figure 31:
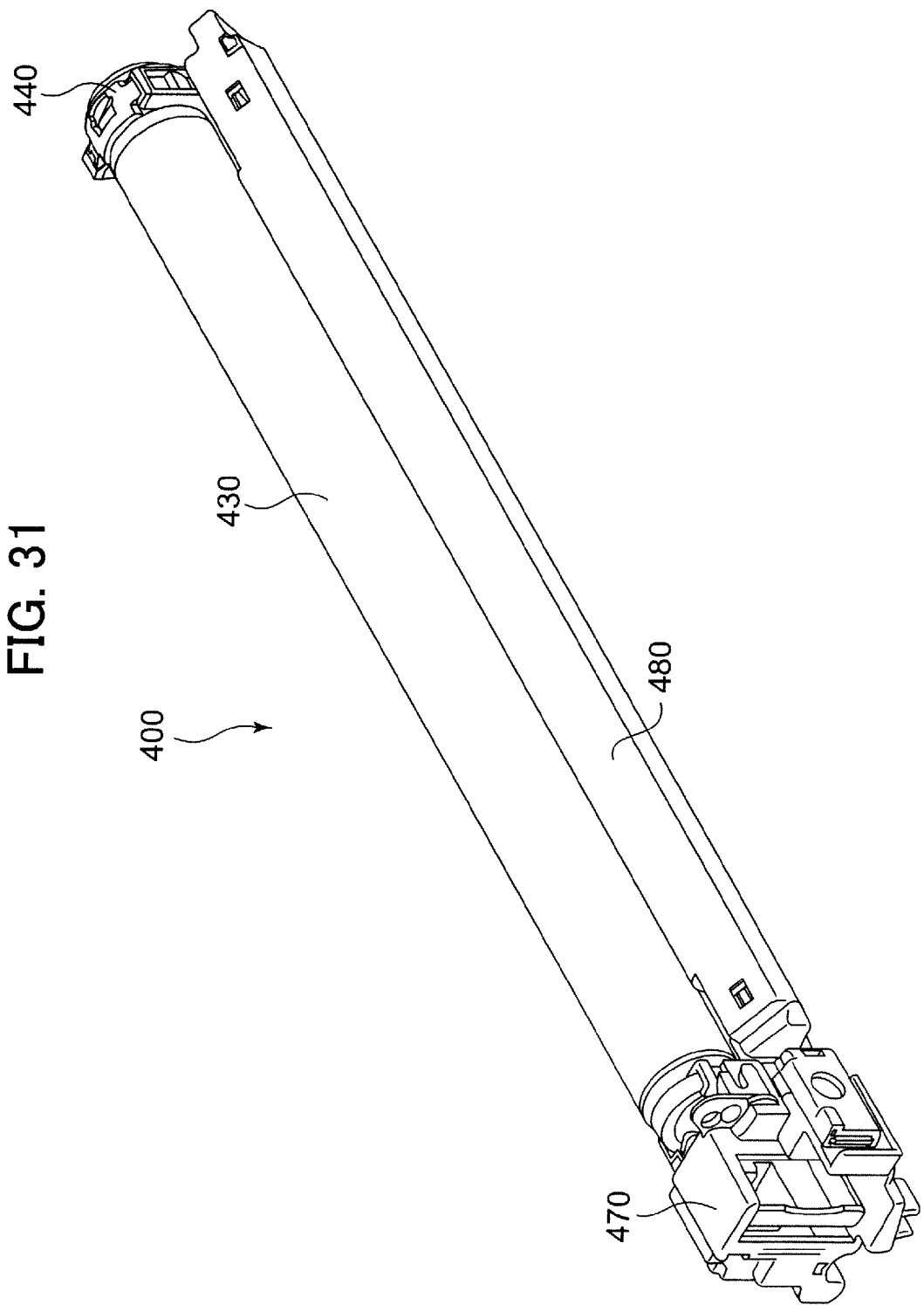
Figure 32:
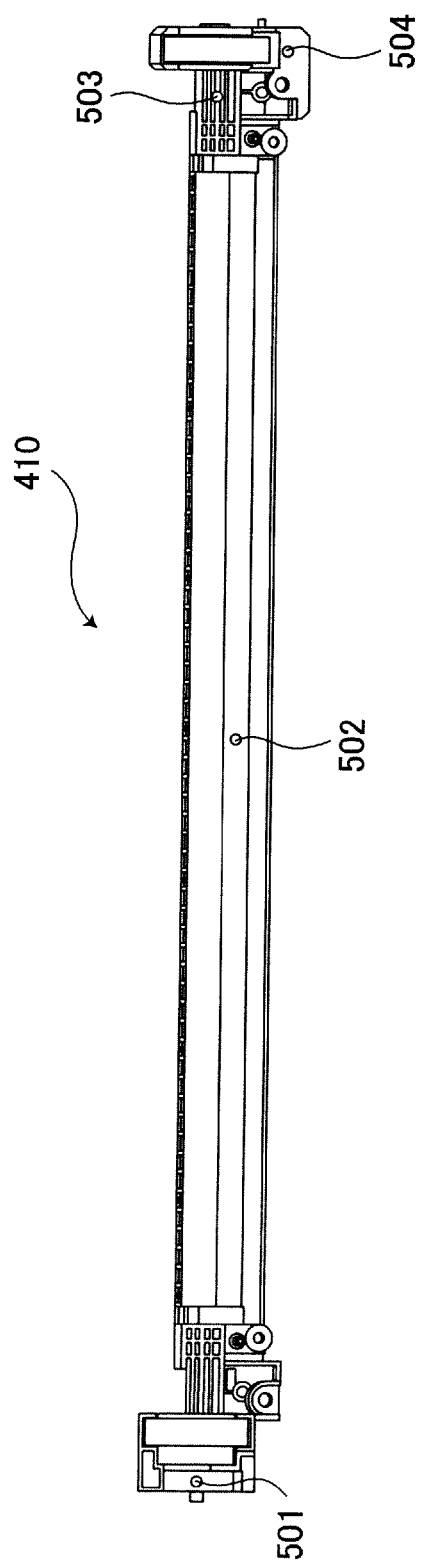
Figure 33:
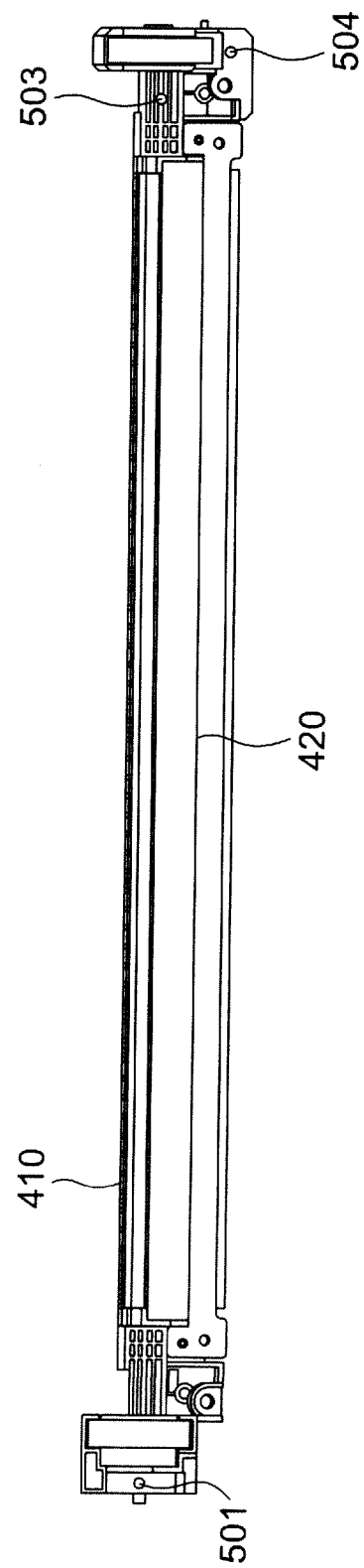
Figure 34:
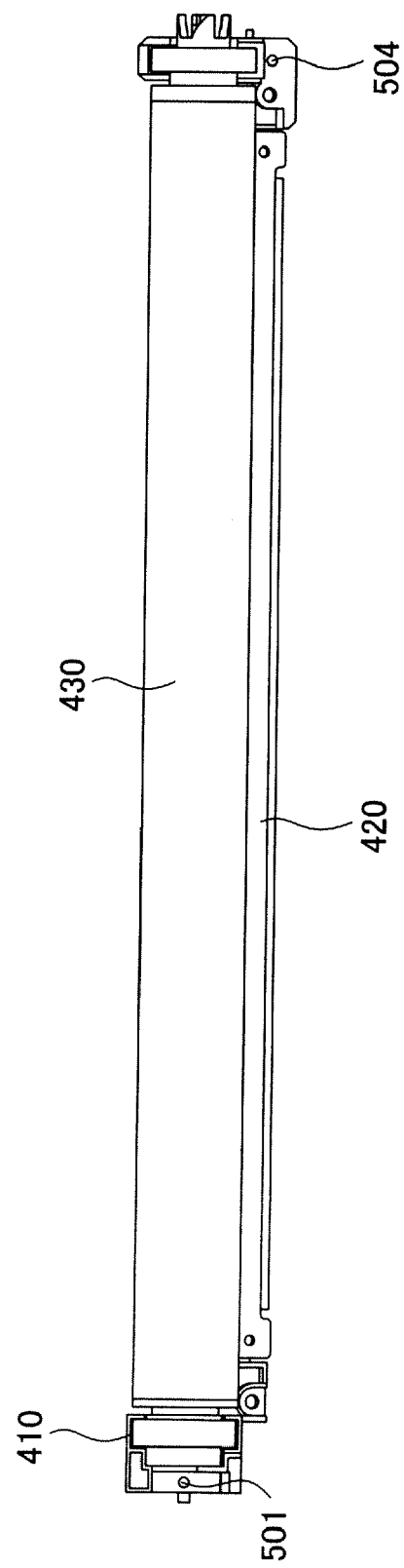
Figure 35:
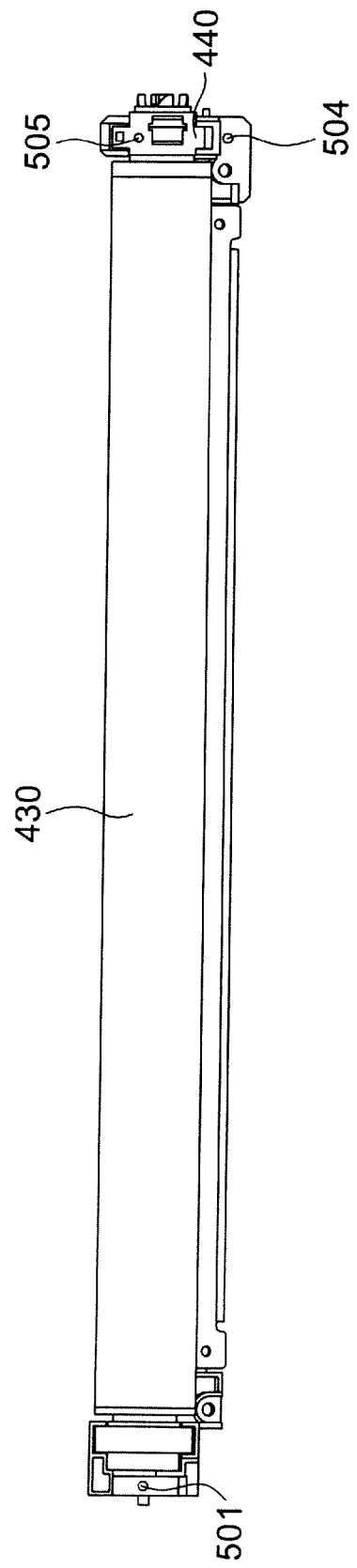
Figure 36:
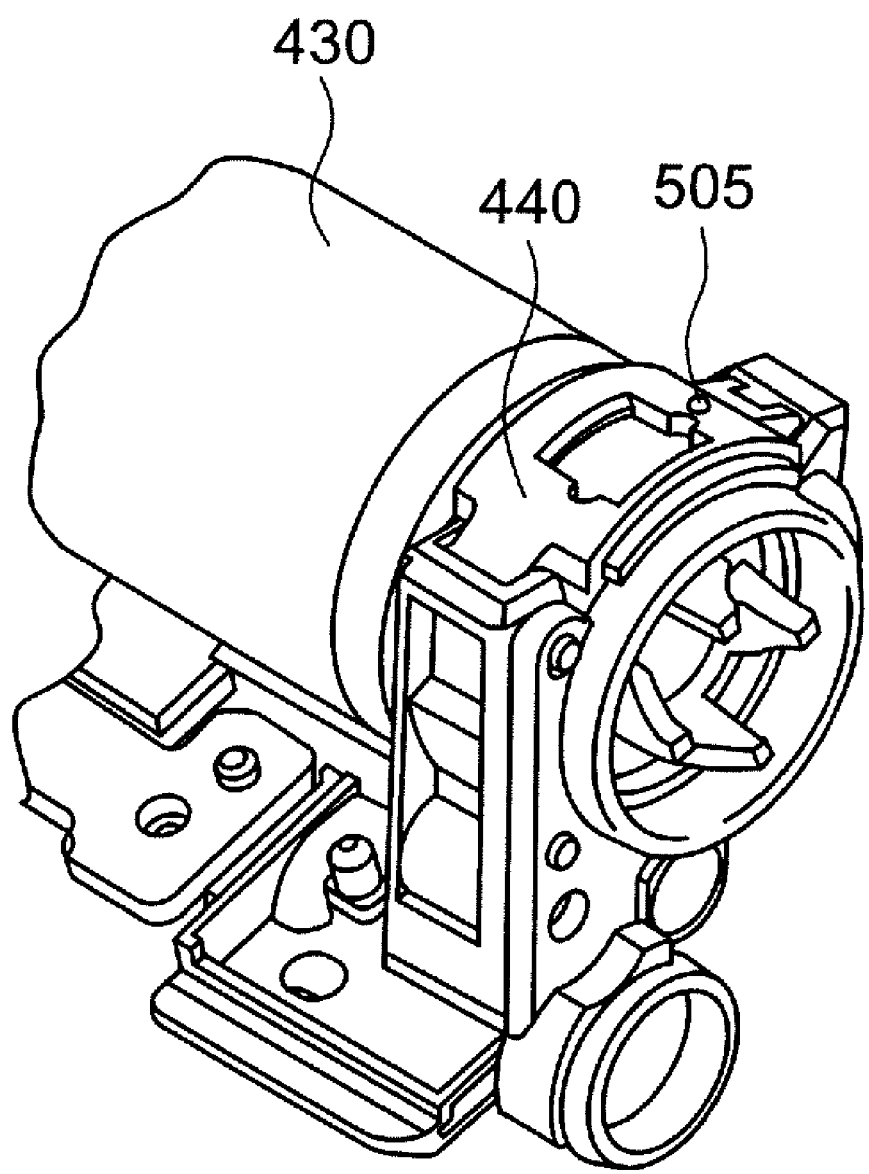
Figure 37:
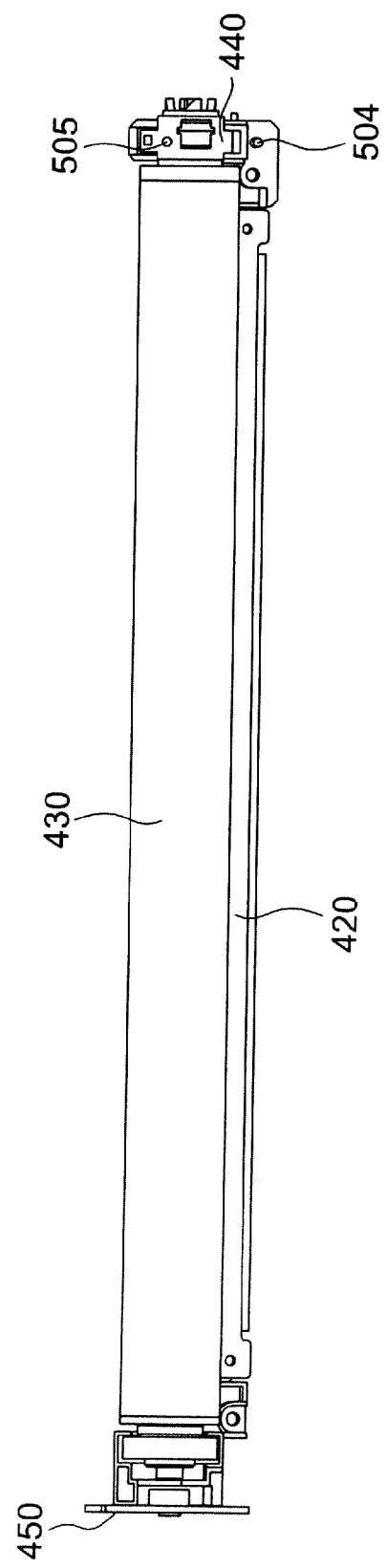
Figure 38:
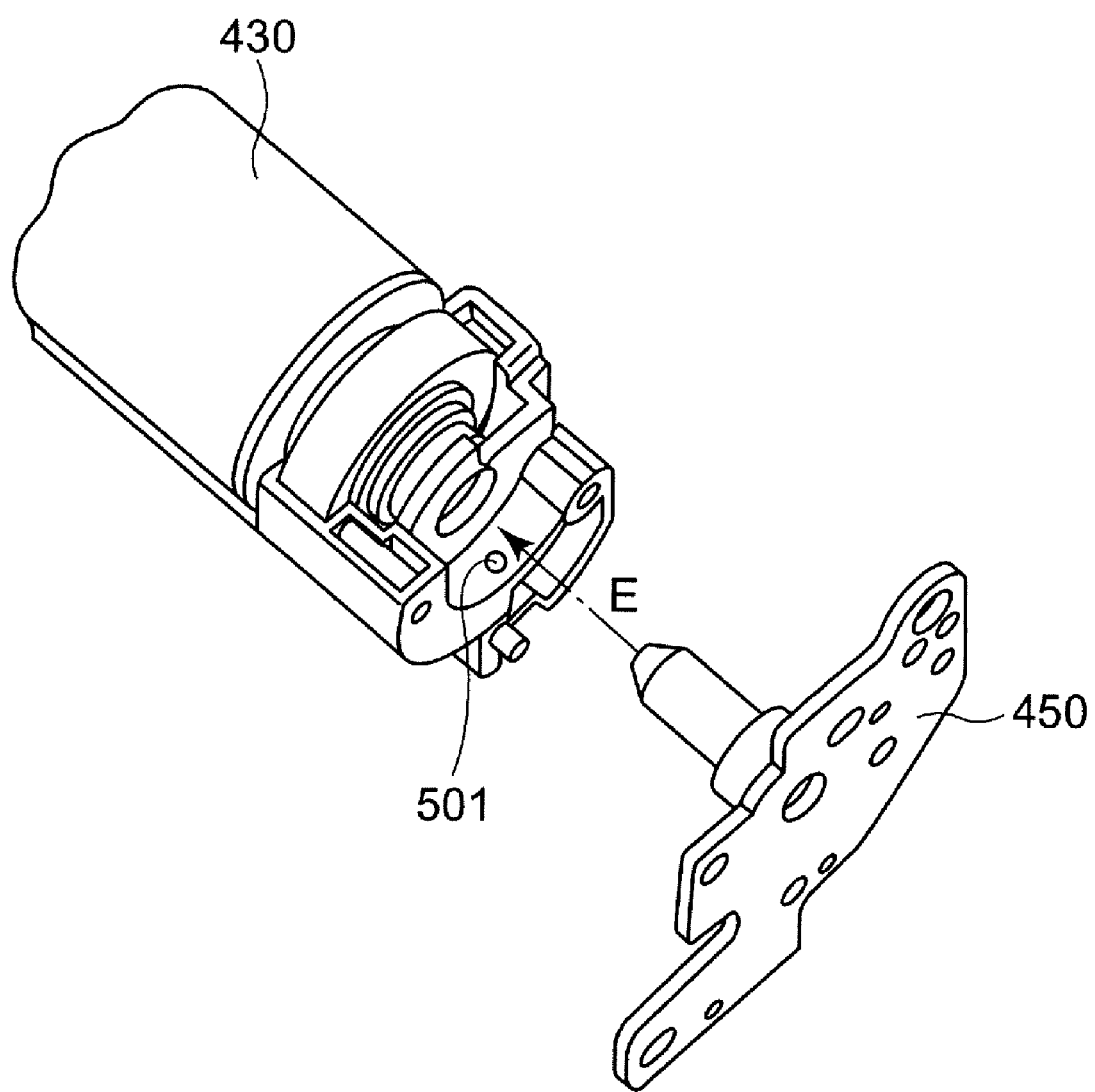
Figure 39:
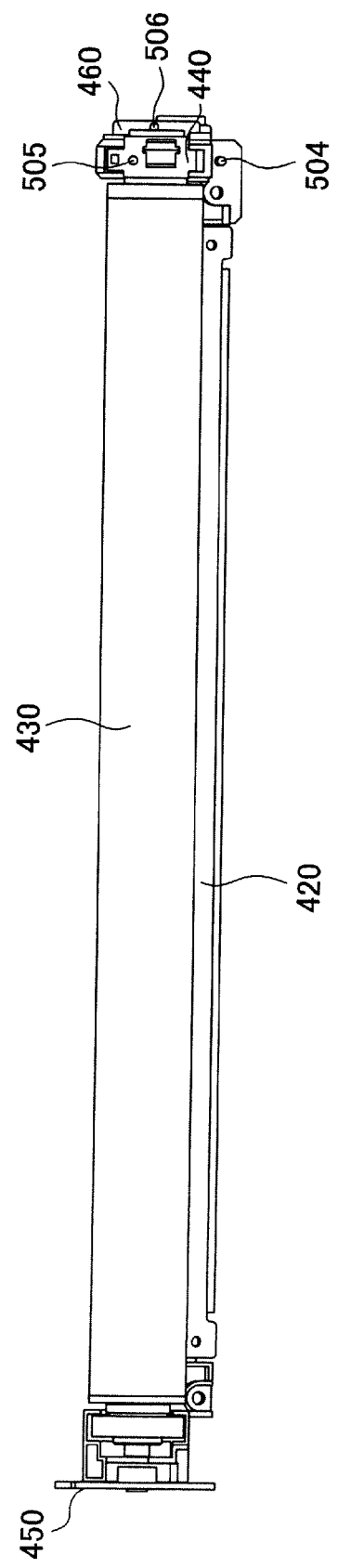
Figure 40:
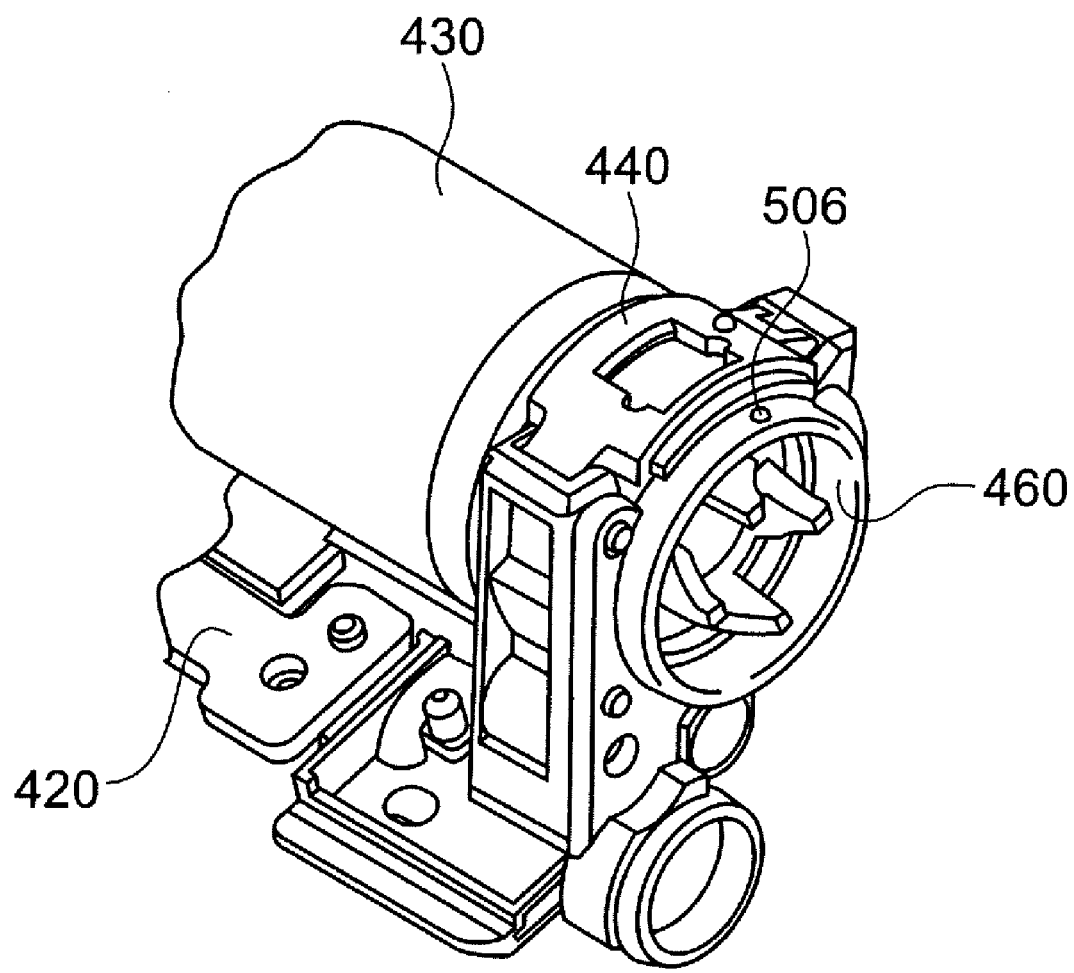
Figure 41:
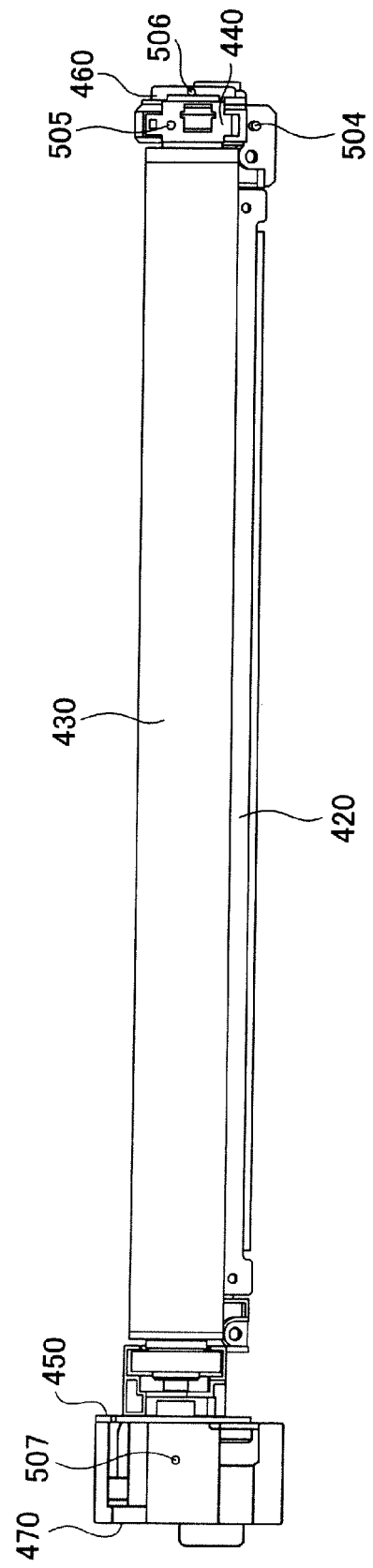
Figure 42:
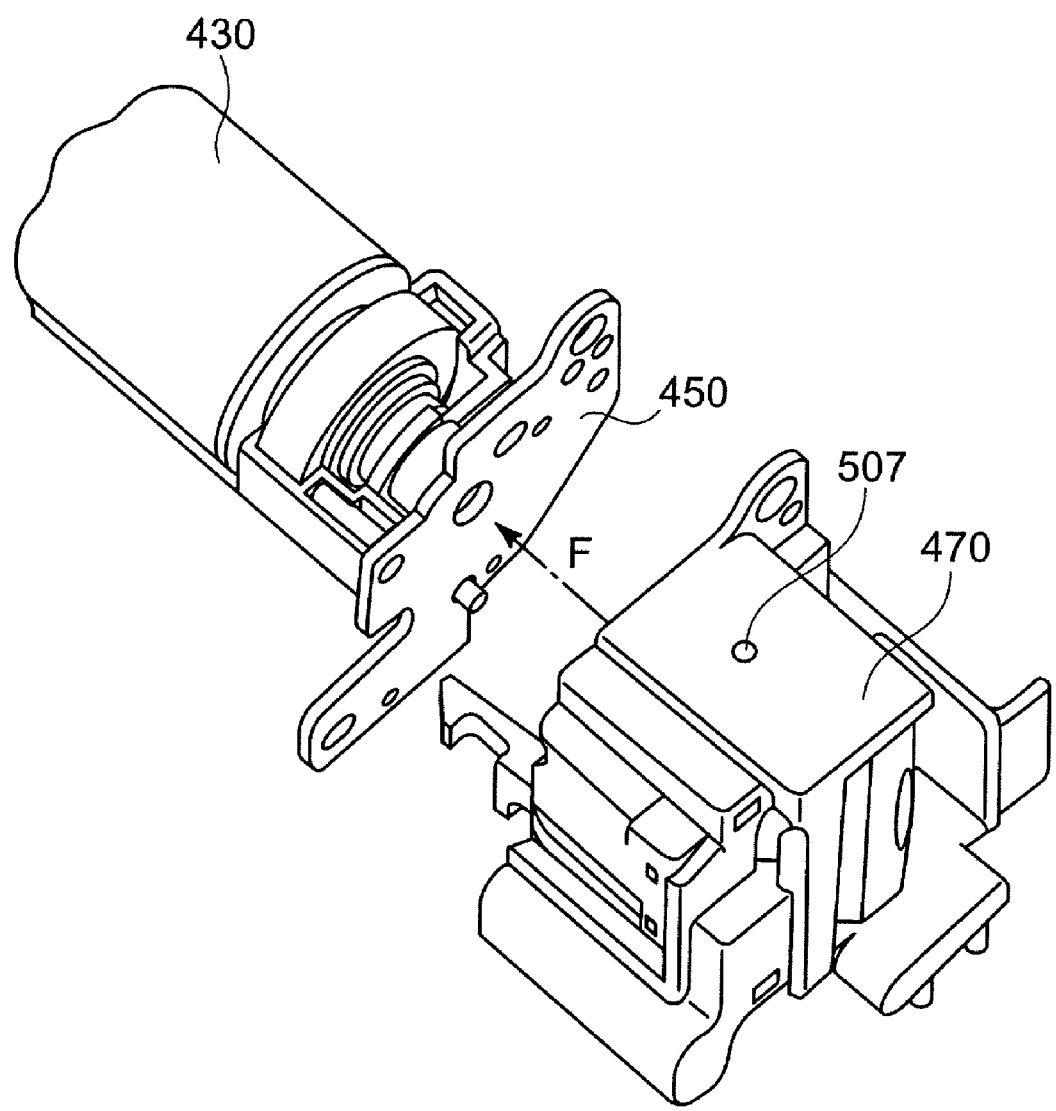
Figure 43:
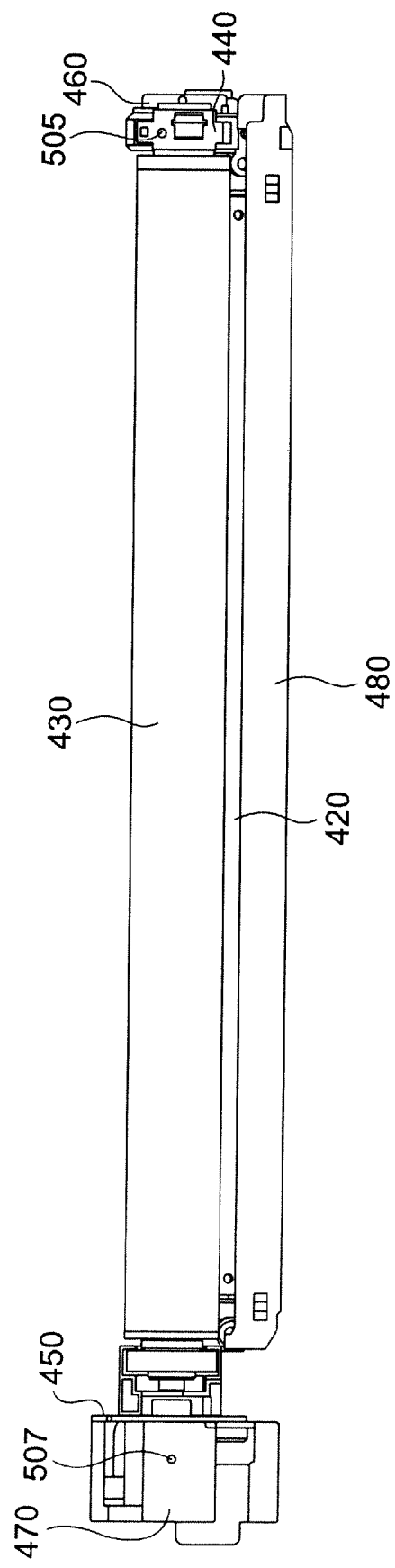

The processes illustrated in FIG. 11 correspond to the processes illustrated in FIGS. 4 in the first exemplary embodiment illustrated in FIGS. 4 to 7;

The processes illustrated in FIG. 12 correspond to the processes illustrated in FIGS. 5 in the first exemplary embodiment illustrated in FIGS. 4 to 7;

The processes illustrated in FIG. 13 correspond to the processes illustrated in FIGS. 6 in the first exemplary embodiment illustrated in FIGS. 4 to 7;

The processes illustrated in FIG. 14 correspond to the processes illustrated in FIGS. 7 in the first exemplary embodiment illustrated in FIGS. 4 to 7;

FIG. 15 illustrates a process of a part holding method of a third exemplary embodiment of the present invention;

FIG. 16 illustrates a process of a part holding method of a third exemplary embodiment of the present invention;

FIG. 17 illustrates a process of a part holding method of a third exemplary embodiment of the present invention;

FIG. 18 illustrates a process of a part holding method of a third exemplary embodiment of the present invention;

FIG. 19 is an explanatory diagram of a part arranging method and a part assembling method as a fourth exemplary embodiment of the present invention;

FIG. 20 is an explanatory diagram of a part arranging method and a part assembling method of a fifth exemplary embodiment of the present invention;

FIG. 21 is an explanatory diagram of a part arranging method and a part assembling method of a sixth exemplary embodiment of the present invention;

FIG. 22 is a schematic block diagram of an essential portion of the image forming apparatus;

FIG. 23 is a perspective view of a robot used for assembling the photosensitive body assembly;

FIG. 24 is a perspective view illustrating an assembling palette and a frame body which is a resin part supported by the assembling palette;

FIG. 25 is a perspective view illustrating the arranging tray and the cleaning members arranged on the arranging tray;

FIG. 26 is a perspective view illustrating a state where the robot approaches the arranging tray before the cleaning member is taken out;

FIG. 27 is a perspective view illustrating a state where one of the cleaning members on the arranging tray is taken out by the robot;

FIG. 28 is a perspective view illustrating a state where the robot which sucks the cleaning member approaches the assembling palette;

FIG. 29 is a perspective view illustrating a state where the cleaning member is assembled into the frame body;

FIG. 30 is a perspective view of the photosensitive body assembly after the assembling operation;

FIG. 31 is a perspective view of the photosensitive body assembly after the assembling operation as viewed from different view points from FIG. 30;

FIG. 32 illustrates the frame body;

FIG. 33 illustrates a state where the cleaning member is assembled into the frame body;

FIG. 34 illustrates a state where the photosensitive body is further assembled;

FIG. 35 illustrates a state where the photosensitive body holding body is further assembled;

FIG. 36 is a partially enlarged perspective view of that state;

FIG. 37 illustrates a state where the support plate is assembled;

FIG. 38 is a partially enlarged perspective view illustrating a state immediately before the support plate is assembled;

FIG. 39 illustrates a state where the rear cover is further assembled;

FIG. 40 is a partially enlarged perspective view of the state;

FIG. 41 illustrates a state where the front cover is further assembled;

FIG. 42 is a partially enlarged perspective view illustrating a state immediately before the front cover is assembled; and FIG. 43 illustrates a state where the charger is further assembled.

DETAILED DESCRIPTION

A conventional measuring method is explained first as a comparative example and then, various exemplary embodiments of the present invention will be explained.

Figure 1:
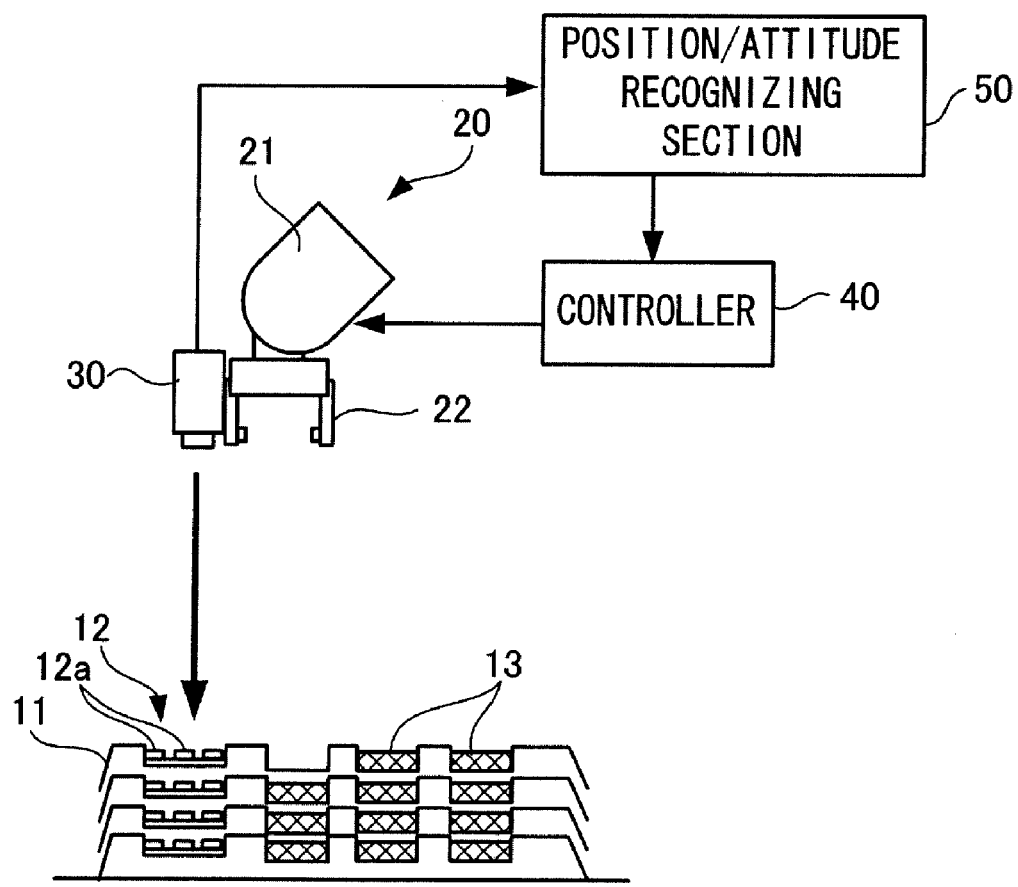
FIG. 1 is a schematic diagram illustrating one example of a part holding method using the conventional measuring method.

FIG. 1 is a schematic diagram illustrating one example of a part holding method using the conventional measuring method.

In FIG. 1, arranging trays 11 are stacked in multiple layers. On each arranging tray 11, an LED board 12 and multiple parts 13 which are to be taken out from the arranging tray 11 are arranged.

A robot 20 is placed on an upper portion of the stacked arranging trays 11. The robot 20 includes a robot arm 21 and a robot hand 22 for taking out the parts 13. A camera 30 is fixed to the robot hand 22. A position and an attitude of the robot 20 are controlled by a controller 40. Since the camera 30 is fixed to the robot hand 22, movement and an attitude of the camera 30 are controlled in unison with the movement and an attitude of the robot hand 22. The controller 40 also controls holding the parts 13 by the robot hand 22, and controls shooting of the camera 30. The controller 40 includes a computer and a control program which is executed in the computer for example.

Multiple LEDs 12a are disposed on each of the LED boards 12. Basically, if three LEDs 12a are disposed on the LED board 12 at a distance from one another, images of these three LEDs 12a obtained by shooting them are input to a position/attitude recognizing section 50, a position and an attitude thereof is obtained by calculation in the position/attitude recognizing section 50. In the position/attitude recognizing section 50, a position and an attitude of a triangle plane whose apexes are these respective three LEDs 12a are obtained, and a position and an attitude of the LED board 12 is recognized. The LED board 12 is fixed to a predetermined position of the arranging tray 11, and the plural parts 13 on the arranging tray 11 are also disposed at respective predetermined positions. The position/attitude recognizing section 50 recognizes positions and attitudes of the parts 13 on the arranging tray 11 based on the information. Like the controller 40, the position/attitude recognizing section 50 may also include a computer and a position recognizing program which is executed in the computer. This computer may be the same computer included in the controller 40.

The measuring method based on an image shot by the camera 30 is basically as follows. That is, a position and an attitude of the camera 30 are known, images of the LEDs 12a on the LED board 12 are shot by the camera 30 whose position and attitude are known, and directions of the LEDs 12a as viewed from the camera 30 are obtained from the positions of the images of the LEDs 12a on the shot image are obtained. A relation between relative position of the LEDs 12a is known and therefore, if the directions of the LEDs 12a as viewed from the camera 30 are obtained, a plane determined by the LEDs 12a, i.e., the position and the attitude of the LED board 12 are obtained from the information.

Alternatively, a size of an image on a shot image of each LED 12a may be utilized using a camera 30 having a shooting lens having a large spherical aberration. If a camera 30 having a shooting lens of a large spherical aberration is used, an image on a shot image of each LED 12a becomes out of focus as being substantially circularly. Further, a size of the image differs depending upon a distance from the camera 30 to each LED 12a. Utilizing this fact, the distance from the camera 30 to each LED 12a is obtained based on the size of the image of the LED 12a. A direction of each LED 12a as viewed from the camera 30 is obtained from a position of the image on the shot image in the same manner as that described above. The directions and distances of the three LEDs 12a on the LED board 12 are obtained in this manner, a three dimensional positions of the three LEDs 12a are obtained, and a plane determined by the three LEDs 12a, i.e., the position and the attitude of the LED board 12 are obtained. Although two examples of the conventional measuring methods have been introduced here, these methods may be combined and used.

The LED board 12 is fixed to the predetermined position of the arranging tray 11 as described above. Therefore, if the position and the attitude of the LED board 12 are obtained, a position and an attitude of the arranging tray 11 itself are also obtained, and a position and an attitude of each part 13 on the arranging tray 11 are also obtained.

If the position and the attitude of each part 13 are obtained, the robot 20 causes the robot hand 22 to face the part 13 and sequentially takes out the part 13 from the arranging tray 11. If all of the parts 13 on the arranging tray 11 which is stacked on the uppermost layer are takes out, the vacant arranging tray 11 itself is removed from the uppermost layer of the stack, and a new arranging tray 11 which newly comes top by the removal is subjected to the same processing.

Figure 2A:
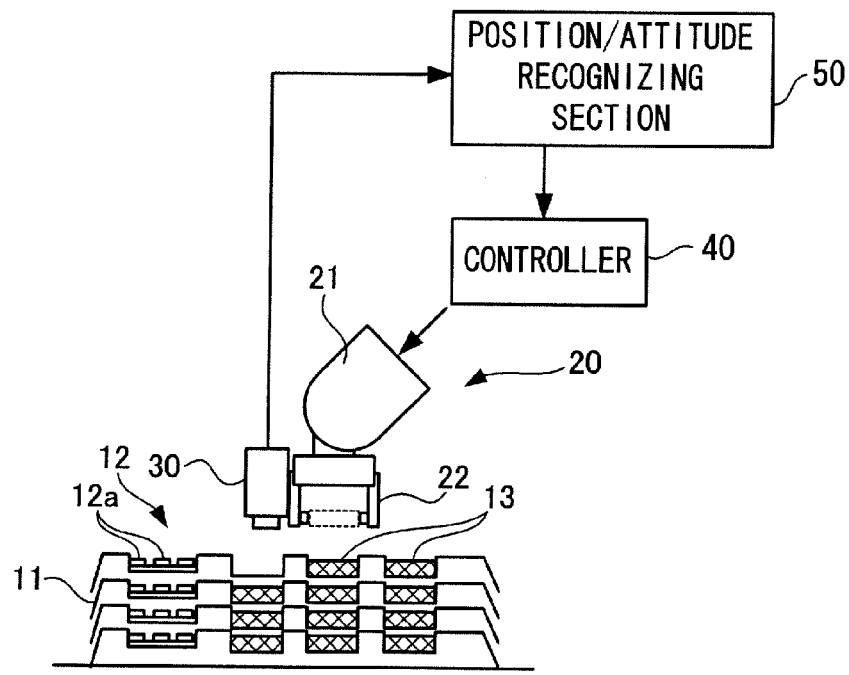
FIG. 2A is a schematic diagrams illustrating a problem of the part holding method illustrated in FIG. 1.
Figure 2B:
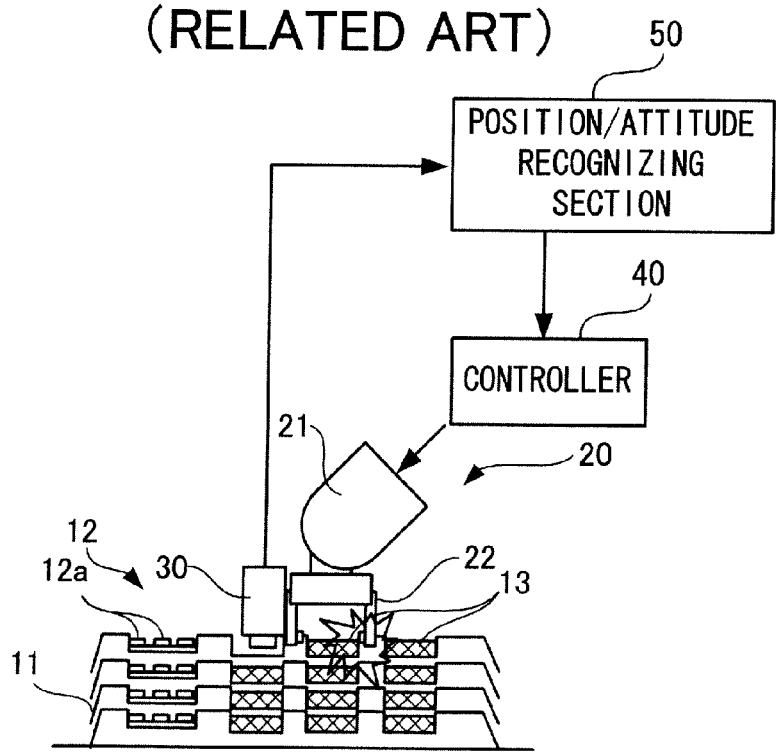
FIG. 2B is a schematic diagrams illustrating a problem of the part holding method illustrated in FIG. 1.

FIGS. 2A and 2B are schematic diagrams illustrating a problem of the part holding method illustrated in FIG. 1.

In the case of the above-described measuring method, the directions of the LEDs 12a as viewed from the camera 30 are measured fairly precisely, but the distance resolution is low, and a distance between the camera 30 and each LED 12a may only be measured with low precision.

Therefore, there are possibilities that the part 13 may not be held as illustrated in FIG. 2A or the robot hand 22 collides against the part 13 or the arranging tray 11 as illustrated in FIG. 2B. If there occurs a collision, the part 13 may not be held and the part 13 may be damaged.

Considering the comparative examples, various exemplary embodiments of the present invention will be explained.

Figure 3:
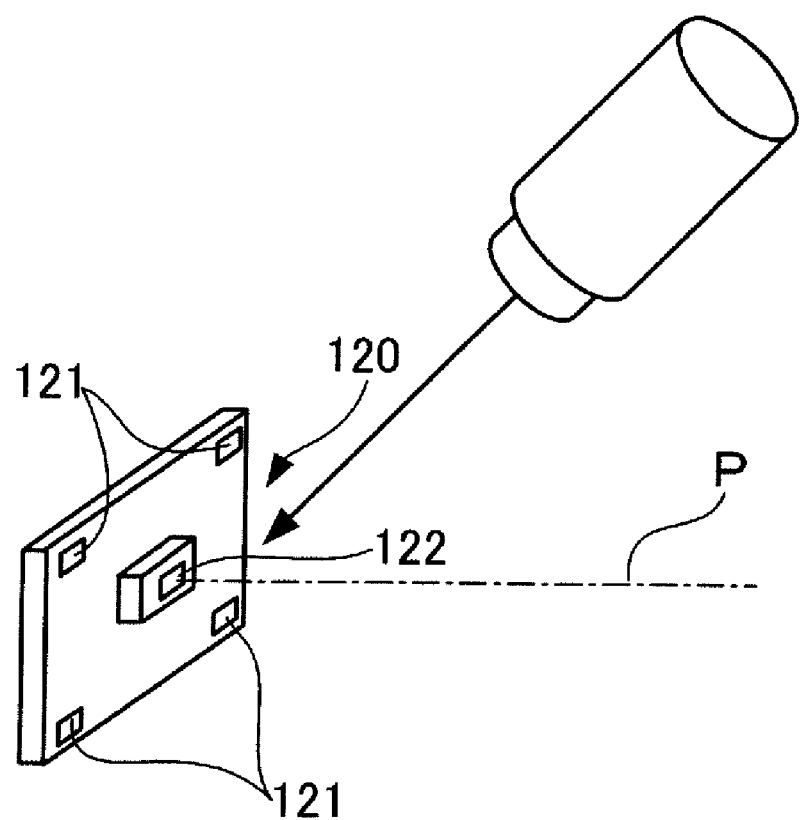
FIG. 3 is an explanatory diagram of a new measuring method which is employed in the following exemplary embodiments.

FIG. 3 is an explanatory diagram of a new measuring method which is employed in the following exemplary embodiments.

Here, an LED board 120 and a camera 30 are illustrated.

Four LEDs 121 are disposed at distances from each other on a surface of the LED board 120, and one LED 122 is disposed at a position slightly rising from the surface of the LED board 120. Positions of these total five LEDs 121 and 122 are known.

Three of the four LEDs 121 disposed on the surface of the LED board 120 are LEDs for determining a position and an attitude of a triangular reference surface (in here, i.e., a triangular surface which is superposed on the surface of the LED board 120) whose apexes correspond to the three LEDs 121. An arranged position of the remaining one LED 121 disposed on the surface of the LED board 120 differs depending upon the individual LED boards 120. This remaining one LED 121 is an LED which has a function as an ID (Identification) for specifying this particular LED board 120 from other LED boards 120. Alternatively, all of the four LEDs 121 may be utilized for recognizing the position and the attitude of the LED board 120 to further enhance the recognition precision.

The one LED 122 is disposed at a position separated away from the reference surface (superposed on the surface of the LED board 120) in a perpendicular direction.

In FIG. 3, the camera 30 is placed in such an attitude that the camera 30 is facing toward the reference surface from a position where a normal P passing through the LED 122 toward the surface of the LED board 120 (the triangular reference surface formed by the three LEDs 121) and an optical axis of the shooting lens do not match with each other. In such manner, if the camera 30 is placed at the position where the normal P and the optical axis do not match with each other and images of the LEDs 121 and 122 are shot by the camera 30 which is placed at the position, a deviation manner of a position on the shot images of the LEDs 121 being on the surface of the LED board 120 and the one LED 122 being at the position slightly rising from that surface differs depending upon the shooting direction.

If one or both of the two examples of the above-described conventional measuring methods are employed and a difference of the deviating manner of position on the shot image of the LEDs 121 and 122 is utilized, the position and the attitude of the reference surface, i.e., the position and the attitude of the LED board 12 in the example illustrated in FIG. 3 may be specified with higher precision than the conventional measuring method.

FIGS. 4 to 7 illustrate processes of a part holding method as a first exemplary embodiment of the present invention.

The same elements as those of the comparative example illustrated in FIGS. 1 and 2 are designated with the same symbols, and explanation thereof is omitted. The first exemplary embodiment is different from the comparative example in that in the first exemplary embodiment, the LED board 120 illustrated in FIG. 3 is placed on the arranging tray 11. Further, control contents of the robot 20 and the camera 30 by the controller 40 and calculation by the position/attitude recognizing section 50 for recognizing the position and attitude are also different from those of the comparative example illustrated in FIGS. 1 and 2. The controller 40 controls and the position/attitude recognizing section 50 recognizes the position and attitude as are described below.

In the case of the part holding method as the first exemplary embodiment, as illustrated in FIG. 4, an image of the LED board 120 on the uppermost arranging tray 11 among the stacked arranging trays 11 is shot by the camera 30 when the robot 20 is in the initial position.

When the robot 20 is in the initial position, the camera 30 is located directly above the LED board 120. However, the stacked arranging trays 11 are roughly placed on a stage by an operator, the camera 30 is located directly above the arranging tray 11 which is placed at a standard position, and the LED board 120 may be deviated from a location directly below the camera 30 in some cases depending upon a position where the arranging tray 11 is actually placed. The LED board 120 sufficiently falls within a shooting angle of view of the camera 30 when the robot 20 is in the initial position.

Here, first, a first position and an attitude measurement are performed by the camera 30 when the robot 20 is in the initial position as illustrated in FIG. 4.

According to the LED board 120 employed here, the one LED 122 is located at a position slightly rising from the other LEDs 121 as illustrated in FIG. 3, but in the case of the first measurement, since the camera 30 is located substantially directly above the LED board 120 and the distance resolution is low, even if the one LED 122 is located at the slightly higher position, the precision for specifying the position and attitude of the LED board 120 is not enhanced so much and thus, in this first measurement, the position and attitude are specified with low precision.

Next, based on the position and attitude of the LED board 120 obtained by the first measurement, the robot 20 is moved to a position where the measurement may be carried out with the highest precision in principle (see FIG. 3). The position where the measurement may be carried out with high precision is a position where a shooting optical axis of the camera 30 and a normal passing through the slightly rising LED 122 illustrated in FIG. 3 toward the LED board 120 do not match with each other, and is a position where a deviation of the shooting position of the slightly rising LED 122 illustrated in FIG. 3 on the shot image by the camera 30 is large.

In the first exemplary embodiment, not only the position of the camera 30 is moved, but also the attitude of the camera 30 is changed so that the LED board 120 is placed on the shooting optical axis of the camera 30.

After the camera 30 is moved to a position where measurement with high precision may be carried out, the second shooting is carried out (see FIG. 6).

In this second measurement, in addition to the conventional measuring method, due to the fact that the LED 122 illustrated in FIG. 3 is placed on the position rising from the plane (surface of the LED board 120) formed by the other LEDs 121, a measurement based on the fact that the position on the shot image is deviated is carried out, thereby obtaining the position and attitude of the LED board 120 precisely.

By the second measurement, the position and attitude of the LED board 120 are specified precisely, the position and attitude of the arranging tray 11 where the LED board 120 are placed at the predetermined position are also specified precisely, and positions and attitudes of the plural parts 13 placed on predetermined positions on the arranging tray 11 are also specified precisely.

Next, as illustrated in FIG. 7, the robot hand 22 is placed at a position and an attitude right opposed to a part 13 to be taken out from the arranging tray 11, the part 13 is held by the robot hand 22 and taken out from the arranging tray 11. Since the position and attitude of the part 13 to be taken out are precisely specified, failure of the holding of the part 13 by the robot hand 22 and the taking out operation of the grasped part 13 from the arranging tray 11 may largely be reduced.

All of the parts 13 in the uppermost arranging tray 11 are taken out and the upper most arranging tray 11 becomes empty, the uppermost arranging tray 11 itself is detached from the uppermost layer, and the same operation is carried out for the next arranging tray 11 which newly comes top.

The uppermost empty arranging tray 11 may be detached manually or by the robot 20.

Here, in the case of the first exemplary embodiment illustrated in FIGS. 4 to 7, the camera 30 is moved in the diagonal attitude oriented to the LED board 120 during the second shooting operation as illustrated in FIGS. 5 and 6, but the camera 30 may be oriented in the same direction as that of the normal P so that an images of the LEDs 121 and 122 on the LED board 120 are taken at a position deviated from the center of the shooting screen of the camera 30. In this case, aberration of the shooting lens of the camera 30 generated when the LEDs 121 and 122 are deviated from the center of the shooting screen may be taken into consideration.

In this first exemplary embodiment, when the position and attitude of the LED board 120 are specified, measurement with high precision is carried out in the first shooting operation and the second shooting operation separately, but when it may be expected that a position where the arranging tray 11 is placed and an attitude of the arranging tray 11 when it is placed are not largely varied, the first shooting operation may be omitted, the second shooting operation may be carried out on the assumption that the LED board 120 is in a standard position and attitude, and the directions and the distances of the LEDs 121 and 122 may be measured.

In the first exemplary embodiment, the position and attitude of the camera 30 and the robot 20 may be integrally changed. In this case, one moving mechanism suffices, but the robot 20 and the camera 30 may separately move. In this case, moving mechanisms for the robot 20 and for the camera 30 are separately required, but it is unnecessary to cause the robot 20 to perform a wasteful operation for shooting an image, it is unnecessary to cause the camera 30 to perform a wasteful operation for taking out the part 13, waste operations are reduced and thus lifetime of the moving mechanism is increased.

Although an electricity supplying method for illuminating the LEDs 121 and 122 is not referred to in the first exemplary embodiment, a battery may be mounted on the LED board 120 and electricity may be supplied to the LEDs 121 and 122 from the battery. Alternatively, a coil or an antenna may be mounted on the LED board 120, electricity may be supplied externally by electromagnetic induction or radio wave, and the LEDs 121 and 122 may be illuminated by the supplied electricity. In the latter case, it is unnecessary to mount a battery which is a consumable item on the LED board 120, and maintainability may be enhanced.

A retroreflector may be used instead of the LEDs 121 and 122 in the first exemplary embodiment. The retroreflector has characteristics to reflect incident light thereto in its incident direction. If the retroreflector is provided instead of the LEDs 121 and 122 on the LED board 120 and it is illuminated from a camera 30 side and the reflected light is shot by the camera 30, the same measurement as that when the LEDs 121 and 122 are provided may be carried out, and since the retroreflector itself does not require electricity, maintainability may be enhanced also in this case.

In the case of the retroreflector, since it is unnecessary to supply electricity to the arranging tray 11 or to provide an electricity generating source, this is suitable for an explosion-proof environment.

Next, a part holding method according to a second exemplary embodiment of the present invention will be explained. In the second and subsequent exemplary embodiments, illustration of elements corresponding to the controller 40 and the position/attitude recognizing section 50 illustrated in FIGS. 4 to 7 is omitted to avoid illustration complexity in the drawings.

Figure 8:
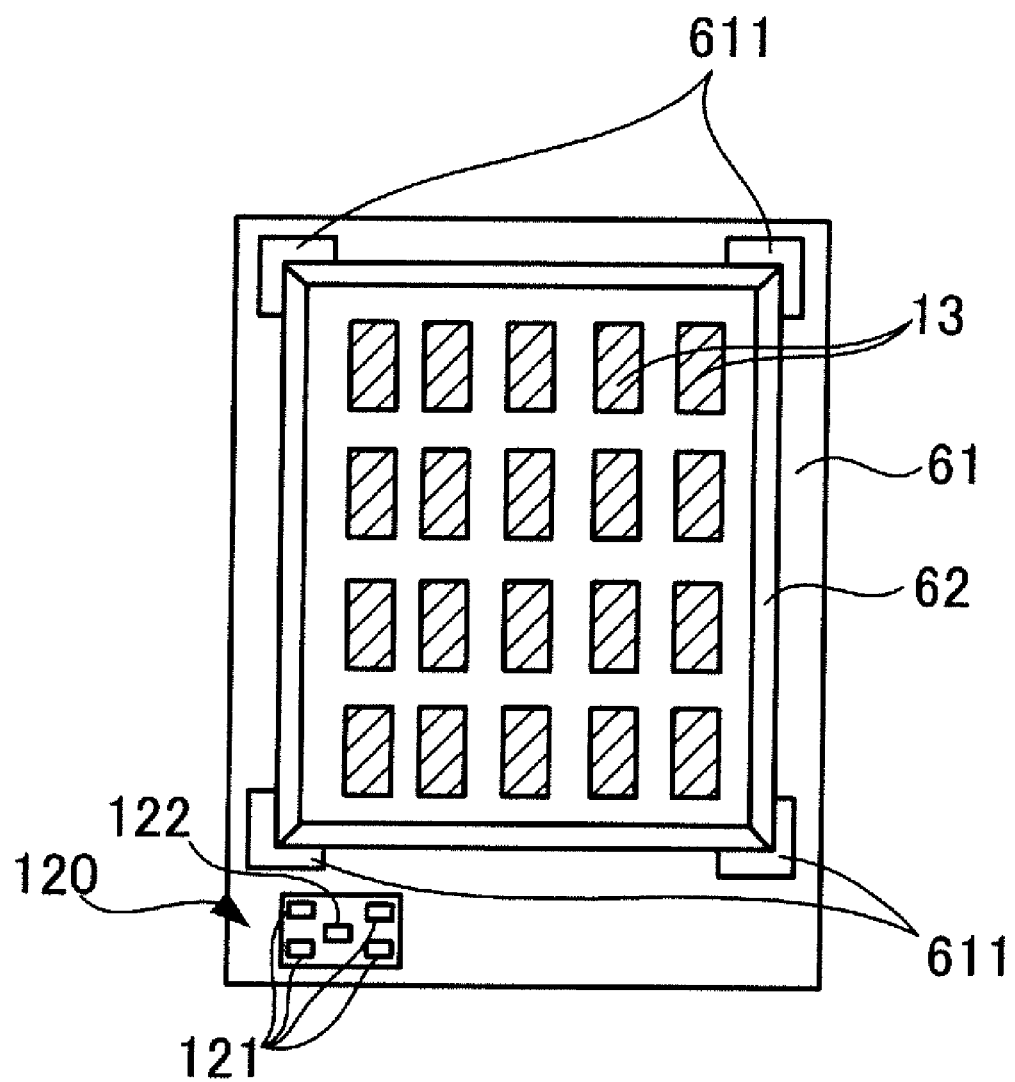
FIG. 8 is a plan view an arranging tray carrying plate and an arranging tray employed in the part holding method of the second exemplary embodiment of the present invention.

FIG. 8 is a plan view an arranging tray carrying plate and an arranging tray employed in the part holding method of the second exemplary embodiment of the present invention.

In the second exemplary embodiment, an arranging tray 62 is placed on an arranging tray carrying plate 61. The arranging tray carrying plate 61 includes arranging tray fixing portions 611 at positions corresponding to four corners of the arranging tray 62. The arranging tray 62 is carried on the arranging tray carrying plate 61 in a state where the arranging tray 62 is reliably positioned by the arranging tray fixing portions 611. The parts 13 which are to be taken out are placed on the predetermined positions on the arranging tray 62. The LED board 120 is fixed to a predetermined position of the arranging tray carrying plate 61. The LED board 120 has a shape illustrated in FIG. 3. Four LEDs 121 are provided on the surface of the LED board 120 and one LED 122 is provided on a location slightly rising from the surface. If the position and attitude of the LED board 120 are recognized by a measurement similar to that described above, a position and an attitude of the arranging tray 62 carried on the arranging tray carrying plate 61 are uniquely determined, and positions and attitudes of the plural parts 13 placed on the arranging tray 62 are also uniquely determined.

Figures 9A, 9B:
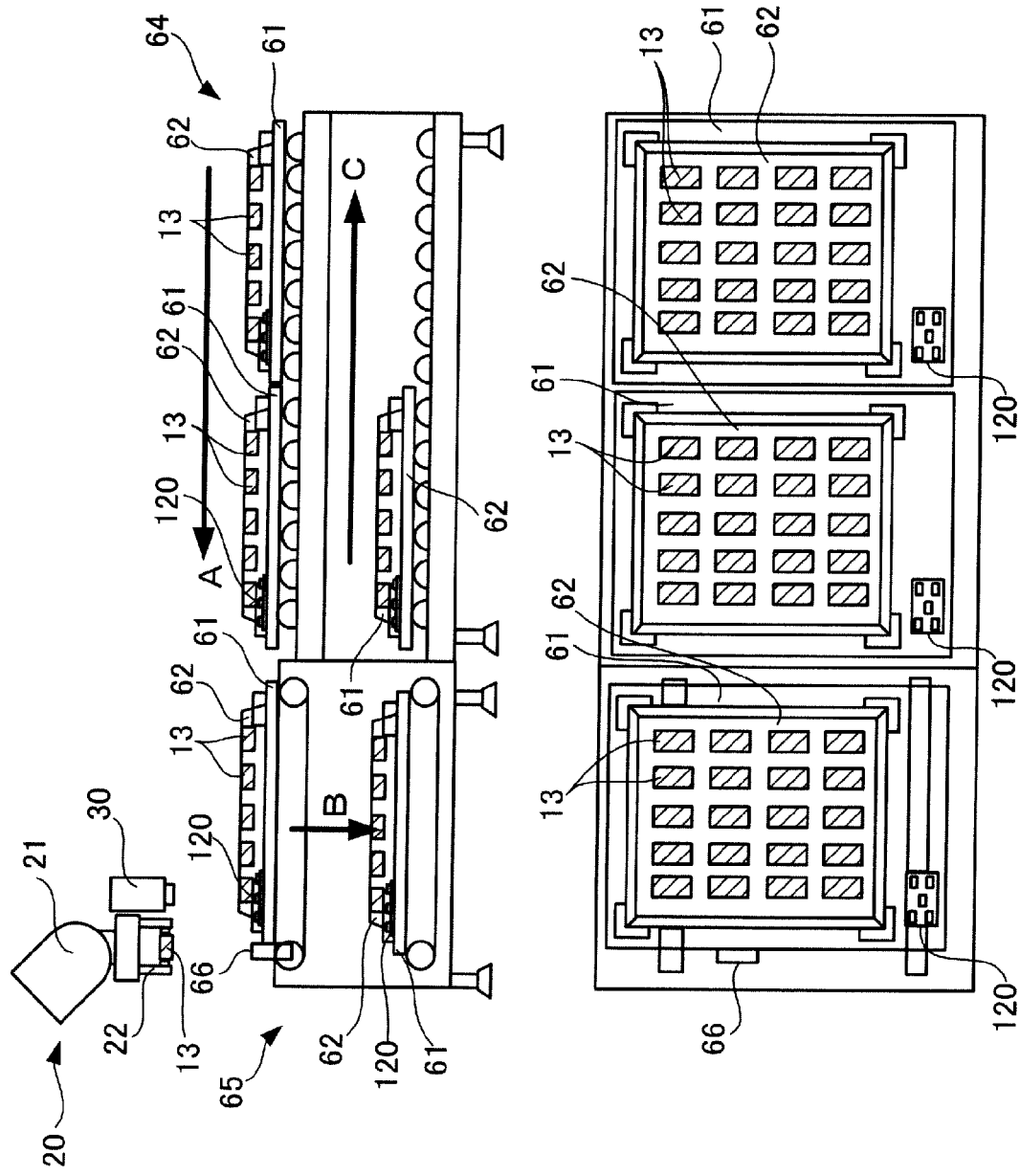
FIG. 9A is a side view illustrating a transfer mechanism of the arranging tray carrying plate on which the arranging tray 62 is placed.
FIG. 9B is a plan view illustrating a transfer mechanism of the arranging tray carrying plate on which the arranging tray is placed.

FIG. 9A is a side view and FIG. 9B is a plan view illustrating a transfer mechanism of the arranging tray carrying plate on which the arranging tray 62 is placed.

In a state where the arranging tray 62 on which the parts 13 are placed is carried on the arranging tray carrying plate 61, the arranging tray 62 which is placed on the transfer stage 64, transferred in the direction of the arrow A and located at the top in the direction of the arrow A is placed on elevating mechanism 65 and abuts against an abutment portion 66 and stops.

Figure 10:
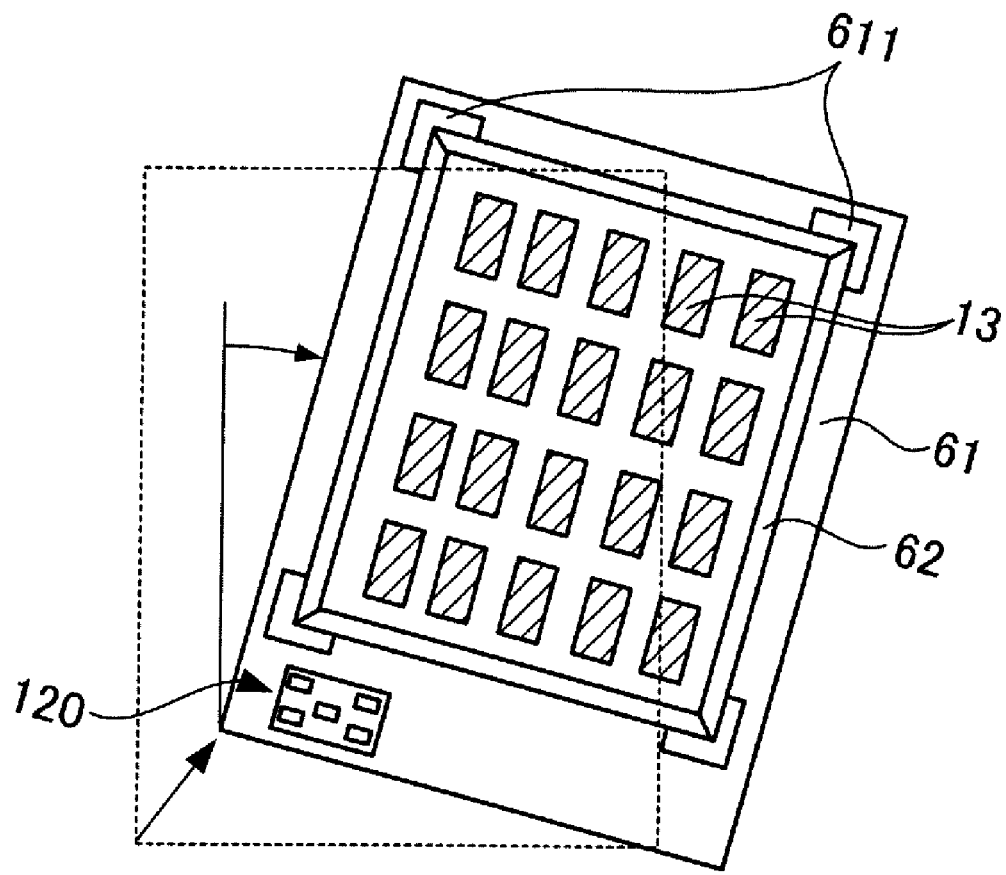
FIG. 10 illustrates the arranging tray carrying plate 61 and the arranging tray in a state where they are placed on the elevating mechanism and stop.

FIG. 10 illustrates the arranging tray carrying plate 61 and the arranging tray 62 in a state where they are placed on the elevating mechanism 65 and stop.

A broken line in FIG. 10 illustrates normal position and an attitude of the arranging tray carrying plate 61.

The arranging tray carrying plate 61 is placed on the transfer stage 64 with an appropriate attitude in many cases, or the arranging tray carrying plate 61 is inclined when it abuts against the abutment portion 66 of the elevating mechanism 65, and is deviated in position or inclined and stops as illustrated in FIG. 10 in some cases.

Here, even if the arranging tray carrying plate 61 is deviated in position or inclined and stops on the elevating mechanism 65 as illustrated in FIG. 10, a position and an attitude of the arranging tray carrying plate 61 are precisely recognized by shooting of the LEDs 121 and 122 (see FIG. 3) disposed on the LED board 120 by the camera 30 and by recognizing the position and attitude of the LED board 120 based on the shot image, and the position and attitude of the arranging tray 62 and positions and attitudes of the parts 13 placed on the arranging tray 62 are also precisely determined. After the position and attitude of the part 13 are precisely determined, the robot hand 22 is right opposed to the part 13 whose position and attitude are precisely determined and reliably holds the part 13, and the part 13 is reliably taken out from the arranging tray 62. When all of the parts 13 on the arranging tray 62 placed on the arranging tray carrying plate 61 which moves from the transfer stage 64 to the elevating mechanism 65 are taken out, the elevating mechanism 65 is lowered in the direction of the arrow B, the arranging tray carrying plate 61 on which an empty arranging tray 62 is placed is delivered to the transfer stage 64 from the elevating mechanism 65, and is transferred in the direction of the arrow C by the transfer stage 64.

The elevating mechanism 65 again rises and receives a next arranging tray carrying plate 61 which has been transferred by the transfer stage 64 in the direction of the arrow A.

By repeating the above-described operation, the parts 13 on the plural arranging trays 62 placed on the plural arranging tray carrying plates 61 are taken out in succession.

FIGS. 11 to 14 illustrate processes of the holding and taking out method of the parts 13 on the arranging tray 62.

The processes illustrated in FIGS. 11 to 14 correspond to the processes illustrated in FIGS. 4 to 7 in the first exemplary embodiment illustrated in FIGS. 4 to 7. That is, in the second exemplary embodiment, the shape of the arranging tray 62 is different, the way to obtain a position and an attitude of the LED board 120, the holding method and the taking out method of the part 13 are the same as those of the first exemplary embodiment illustrated in FIG. 4 to 7 except that the arranging tray 62 is placed on the arranging tray carrying plate 61 and the LED board 120 is fixed to the arranging tray carrying plate 61. Therefore, detailed explanation is omitted here.

FIGS. 15 to 18 illustrate processes of a part holding method of a third exemplary embodiment of the present invention. FIGS. 15 to 18 respectively correspond to FIGS. 4 to 7 in the first exemplary embodiment.

Here, the robot hand 22 holds parts 70.

The part 70 is formed with retroreflectors 71 due to a mode of its surface. The retroreflector 71 has characteristics that irrespective of from which direction the retroreflector 71 receives incident light, the retroreflector 71 returns reflection light in the same direction as the incident direction of the incident light. The retroreflectors 71 correspond to the LEDs 121 and 122 on the LED board 120 illustrated in FIG. 3, and four or more retroreflectors 71 are formed in total at positions on the surface of the part 70 at predetermined distances from one another. A triangular reference surface having three apexes corresponding to three of the four or more retroreflectors 71 is determined. The remaining one retroreflector 71 is place data position slightly separated away from the reference surface toward a normal to the reference surface.

In the third exemplary embodiment, the camera 30 includes an annular light source 32 surrounding the shooting lens 31 located on a front surface thereof. The annular light source 32 is for illuminating the retroreflectors 71 formed on the part 70. If each retroreflector 71 receives illumination light from the annular light source 32, the retroreflector 71 reflects the light toward the camera 30. The camera 30 carries out shooting while capturing the reflection light, and the position and attitude of the part 70 are recognized based on the shot image.

The third exemplary embodiment illustrated in FIGS. 15 to 18 is different from the first exemplary embodiment illustrated in FIGS. 4 to 7 in the above-described points. That is, in the first exemplary embodiment illustrated in FIGS. 4 to 7, a position and an attitude of the LED board 120 are obtained from the LEDs 121 and 122 on the LED board 120, a position and an attitude of the part 13 are obtained based on this, the part 13 is held by the robot hand 22 and is taken out from the arranging tray 11. In the third exemplary embodiment illustrated in FIGS. 15 to 18, reflection light from the retroreflector 71 which is an alternative to the LED is captured, a position and an attitude of the part 70 itself are obtained, and the part 70 is held and brought up by the robot hand 22. Except these points, the obtaining way of the position and the attitude of the part 70 and the holding method of the part 70 are common to those of the first exemplary embodiment illustrated in FIGS. 4 to 7, and explanation of the common portion is omitted.

FIG. 19 is an explanatory diagram of a part arranging method and a part assembling method as a fourth exemplary embodiment of the present invention. Illustration and explanation of points which are obvious from the above-explained first to third exemplary embodiments are omitted.

Here, the LED board 120 and a first part 72 are placed on predetermined positions on the assembling palette 71. The LED board 120 has the shape explained with reference to FIG. 3. The assembling palette 71 is transferred by the transfer stage 79 in the direction of the arrow D in a state where the LED board 120 and the first part 72 are placed on the assembling palette 71, and the assembling palette 71 abuts against the abutment portion (not illustrated) and stops substantially at a position illustrated in FIG. 19.

The camera 30 is fixed to such a position and an attitude that the camera 30 may diagonally shoot an image of the LED board 120 on the stopped assembling palette 71. That is, in this fourth exemplary embodiment, two stage measurements are not carried out unlike the first exemplary embodiment illustrated in FIGS. 4 to 7, and only one stage measurement corresponding to the second measurement of the first exemplary embodiment is carried out. With this, the measuring time is reduced as compared with a case where two measurements are carried out as in the first exemplary embodiment. When the stopped position and the stopped attitude of the assembling palette 71 are not largely varied, the image shooting operation and the measurement may be carried out only once from the position inclined from the normal of the LED board 120 as in the fourth exemplary embodiment illustrated in FIG. 19 and the position and attitude of the LED board 120 may be obtained. If the position and attitude of the LED board 120 are obtained, a position and an attitude of the first part 72 placed on the predetermined position of the same assembling palette 71 are also obtained.

On the other hand, the robot hand 22 holds a second part 73. The second part 73 is assembled on the first part 72 on the assembling palette 71. The robot 20 changes its position and attitude based on information of a position and an attitude of the first part 72 obtained based on a shot image taken by the camera 30, brings the second part 73 right opposed to the first part 72 on the assembling palette 71, and assembles the second part 73 on the first part 72.

From a viewpoint that the second part 73 is assembled on the first part 72, the fourth exemplary embodiment corresponds to one exemplary embodiment of the part assembling method of the present invention, and from a viewpoint that the second part 73 is placed on the assembling palette 71, the fourth exemplary embodiment also corresponds to one exemplary embodiment of a part arranging method of the invention.

Although the camera 30 is fixed in the fourth exemplary embodiment, a moving mechanism for changing a position and an attitude of the camera 30 may be provided, the camera 30 is moved independently from the robot 20 and measurements may be carried out in two stages like the first exemplary embodiment illustrated in FIGS. 4 to 7.

FIG. 20 is an explanatory diagram of a part arranging method and a part assembling method of a fifth exemplary embodiment of the present invention. Here, differences of the fifth exemplary embodiment over the fourth exemplary embodiment illustrated in FIG. 19 are explained.

In the case of the fifth exemplary embodiment illustrated in FIG. 20, the LED board 120 is diagonally fixed to a predetermined position on the assembling palette 71, and the camera 30 is fixed to a position where the camera 30 may shoot an image directly above the LED board 120 which is diagonally fixed.

With this, an effect that an image of the LED board 120 may be shot from a diagonal direction with respect to the normal and a position and an attitude of the LED board 120 are obtained precisely is maintained as it is, and since the camera 30 may be fixed directly above the LED board 120, installation space may be reduced.

FIG. 21 is an explanatory diagram of a part arranging method and a part assembling method of a sixth exemplary embodiment of the present invention. Here, differences of the sixth exemplary embodiment over the fourth exemplary embodiment illustrated in FIG. 19 will be explained.

In the case of the fourth exemplary embodiment illustrated in FIG. 19, the camera 30 is fixed such that it may not move. In the case of the sixth exemplary embodiment illustrated in FIG. 21, however, the camera 30 is fixed to the robot hand 22 as in the first exemplary embodiment illustrated in FIGS. 4 to 7 and the camera 30 moves together with the robot hand 22.

Even when a position and an attitude are obtained by shooting the LED board 120 only diagonally without carrying out the measurement in two stages, the camera 30 may be fixed to the robot 20 as illustrated in FIG. 21. If the camera 30 is fixed to the robot 20, interference between the robot 20 and the camera 30 may reliably be avoided at the time of assembling operation, and a freedom degree of movement of the robot 20 for assembling operation is enhanced.

Next, a seventh exemplary embodiment in which all of the position/attitude recognizing method, the part holding method, the part arranging method and the part assembling method of the present invention are included is explained. First, an outline of an image forming apparatus which is a prerequisite thereof will be explained.

FIG. 22 is a schematic block diagram of an essential portion of the image forming apparatus.

As illustrated in FIG. 22, the image forming apparatus 100 includes four image forming units 110Y, 110M, 110C and 110K. The image forming units 110Y, 110M, 110C and 110K respectively include photosensitive bodies 111Y, 111M, 111C and 111K which rotate in the direction of the arrow A, chargers 113Y, 113M, 113C and 113K, exposure apparatuses 114Y, 114M, 114C and 114K, developing rolls 112Y, 112M, 112C and 112K, primary transfer rolls 120Y, 120M, 120C and 120K, and cleaning members 115Y, 115M, 115C and 115K.

The image forming apparatus 100 may print in full color. Symbols Y, M, C and K added to the ends of the elements explained above represent elements for forming image of yellow, magenta, cyan and black, respectively.

The image forming apparatus 100 also includes an intermediate transfer belt 130 which runs in the direction of the arrow B, a secondary transfer roll 140, a tension roller 131, and an image information processor 150 which sends image information to the image forming units 110Y, 110M, 110C and 110K.

The image information processor 150 decomposes image information which is input from outside into image information of each color, and sends the image information to the exposure apparatuses 114Y, 114M, 114C and 114K.

A basic image forming operation of the image forming apparatus 100 will be explained.

In the image forming apparatus 100, a toner image forming operation by the yellow image forming unit 110Y is started, and predetermined electric charge is applied to a surface of the photosensitive body 111Y which rotates in the direction of the arrow A by the charger 113Y. Next, the surface of the photosensitive body 111Y is irradiated with exposure light corresponding to the yellow image produced by the exposure apparatus 114Y in accordance with image information which is sent from the image information processor 150, and an electrostatic latent image is formed. The electrostatic latent image is developed with yellow toner by the developing roll 112Y, and the yellow toner image is formed on the photosensitive body 111Y. The toner image is transferred to the intermediate transfer belt 130 by the action of the primary transfer roll 120Y.

In the image forming apparatus 100, toner and developer agent including magnetic carrier coated with external additive for securing the electric charging characteristics of the toner are used, and the electrostatic latent image formed on the photosensitive body in accordance with the image information is developed with toner among the developer agent. In the image forming apparatus 100, after a developer agent cartridge is filled with such developer agent is mounted in the apparatus, only toner filling is performed, the toner and the magnetic carrier are mixed, the toner is negatively charged and the external additive of the magnetic carrier is positively charged.

At the timing when a yellow toner image transferred on the intermediate transfer belt 130 reaches the primary transfer roll 120M of the image forming unit 110M of the next color, a toner image is formed by the magenta image forming unit 110M so that the magenta toner image which is the next color image reaches the primary transfer roll 120M. The magenta toner image formed in this manner is superposed and transferred on the yellow toner image on the intermediate transfer belt 130 by the action of the primary transfer roll 120M.

Next, cyan and black toner image forming operations by the image forming units 110C and 110K are carried out at the timing similar to that explained above, and these toner images are sequentially superposed and transferred on the yellow and magenta toner images of the intermediate transfer belt 130 by the action of the primary transfer rolls 120C and 120.

The multi-color toner images transferred on the intermediate transfer belt 130 in this manner is finally secondary transferred on a paper sheet 150 by the secondary transfer roll 140, the multi-color toner image is conveyed in the direction of the arrow C together with the paper sheet 150, the toner image is fixed by a fixing device (not illustrated), and a color image is formed on the paper sheet 150.

Toner remaining on the photosensitive bodies 111Y, 111M, 111C and 111K after the image is transferred to the intermediate transfer belt 130 is scraped off from the photosensitive bodies 111Y, 111M, 111C and 111K by the cleaning members 115Y, 115M, 115C and 115K and the toner becomes toner waste. The scraped toner waste is conveyed in a direction perpendicular to the paper surface of FIG. 22 by a mechanism (not illustrated), and is discharged into a toner waste receiving tank (not illustrated).

In the case of the yellow image forming unit 110Y for example, the photosensitive body 111Y, the charger 113Y and the cleaning member 115Y are assembled into one photosensitive body assembly, and this is disposed in the image forming apparatus 100. The same procedure is taken for other image forming units also.

A seventh exemplary embodiment of the present invention will be explained as an assembling example of the photosensitive body assembly.

FIG. 23 is a perspective view of a robot used for assembling the photosensitive body assembly.

Here, a robot arm 201 and a robot hand 202 included in a robot 200 is illustrated. The robot hand 202 includes a suction pad 203 which sucks (one example of holding according to the present invention) a part by vacuum suction to bring the part up. A measuring camera 290 having a shooting lens of great spherical aberration is fixed to the robot hand 202. A position and an attitude of the robot hand 202 are freely changed.

FIG. 24 is a perspective view illustrating an assembling palette and a frame body which is a resin part supported by the assembling palette. The frame body 410 is a frame body of the photosensitive body assembly and is one of parts included in the photosensitive body assembly.

Four holding pieces 301 are fixed to the assembling palette 300, and an LED board 310 is fixed to the assembling palette 300 by the holding pieces 301. The LED board 310 is provided thereon with three measuring LEDs 311, an LED 312 which is used as an ID for specifying the LED board 310 from other LED boards, and one LED 313 fixed to a position slightly higher than the LED board 310. The three LEDs 311 and the one LED 313 are used for measuring the position and the attitude of the LED board 310. The position of the one LED 312 differs depending upon the LED board 310, the LED board 310 may be distinguished from other LED boards by specifying the position of the LED 312. A method for obtaining the position and attitude of the LED board 310 using the LEDs 311 and 313 on the LED board 310 is the same as the above-explained exemplary embodiments, and detailed explanation thereof is omitted.

The assembling palette 300 includes two holding pieces 302 for holding the frame body 410, and two positioning pins 303 for positioning the frame body 410 on the assembling palette 300. The frame body 410 is provided with two positioning openings 411. The frame body 410 is placed on the holding pieces 302, and the positioning pins 303 are inserted into the positioning openings 411. With this, the positioning pins 303 are placed on predetermined positions of the assembling palette 300.

As explained, the LED board 310 and the frame body 410 are disposed at determined positions on the assembling palette 300. A position and an attitude of the frame body 410 are uniquely obtained by obtaining the position and the attitude of the LED board 310.

FIG. 25 is a perspective view illustrating the arranging tray and the cleaning members arranged on the arranging tray.

Ten cleaning members 420 are arranged on the arranging tray 330 illustrated in FIG. 25. Each cleaning member 420 corresponds to one of the cleaning members 115Y, 115M, 115C and 115K illustrated in FIG. 22. Each cleaning member 420 illustrated in FIG. 25 is a combined part of a rubber part 421 which is in direct contact with the photosensitive body and a sheet metal part 422 which supports the rubber part 421.

The arranging tray 330 includes ten accommodating grooves 331 in which the cleaning member 420 is accommodated one each. One cleaning member 420 is accommodated in each of the accommodating grooves 331. With this, predetermined position and attitude of each cleaning member 420 are maintained on the arranging tray 330.

The arranging tray 330 is provided with a recess 332 in which the LED board 340 is fitted, and the LED board 340 is fitted in the recess 332. The LED board 340 is fitted in the recess 332, and predetermined position and attitude of the LED board 340 on the arranging tray 330 are fixed.

The LED board 340 includes three LEDs 341 and one LED 343 at the same positions as those of the LED board 310 illustrated in FIG. 24. A position of another LED 342 is different from that of the LED 312 on the LED board 310 illustrated in FIG. 24. This is because that the LED 342 functions as an ID for specifying the LED board by changing the position of the LED 342 on an LED board to LED board basis.

Concerning the LED board 340 in FIG. 25 also, a position and an attitude of the LED board 310 are recognized by measurement by the camera 290 and based on this, a position and an attitude of each cleaning member 420 arranged on the arranging tray 330 are obtained. One of the cleaning members 420 arranged on the arranging tray 330 is taken out by the robot 200 illustrated in FIG. 23, and the cleaning member 420 is assembled into the frame body 410 illustrated in FIG. 24.

An assembling order of the cleaning member 420 into the frame body 410 will be explained below.

FIG. 26 is a perspective view illustrating a state where the robot 200 approaches the arranging tray 330 before the cleaning member 420 is taken out.

Then, the camera 290 measures a position and an attitude of the LED board 340, a position and an attitude of the cleaning member 420 are grasped based on this, and a suction pad 221 of a robot hand 220 is controlled to assume a position and an attitude right opposed to a cleaning member 420 to be taken out.

FIG. 27 is a perspective view illustrating a state where one of the cleaning members 420 on the arranging tray 330 is taken out by the robot 200.

The robot 200 brings the suction pad 203 at a position right opposed to one of the cleaning members 420 which is to be taken out this time and then, the suction pad 203 is pushed against the cleaning member 420, the cleaning member 420 is sucked by the suction pad 203 by vacuum adsorption, the cleaning member 420 is brought up as it is, and the cleaning member 420 is taken out from the arranging tray 330.

FIG. 28 is a perspective view illustrating a state where the robot which sucks the cleaning member approaches the assembling palette.

The robot 200 which approaches the assembling palette 300 measures a position and an attitude of the LED board 310 by the camera 290 mounted on the robot 200, a position and an attitude of the frame body 410 are obtained based on this, and the robot 200 moves such that the cleaning member 420 sucked by the suction pad 203 of the robot hand 202 assumes a position and an attitude right opposed to the frame body 410 fixed to the assembling palette 300.

FIG. 29 is a perspective view illustrating a state where the cleaning member 420 is assembled into the frame body 410.

After the cleaning member 420 is opposed to the frame body 410 as described above, the cleaning member 420 is assembled on the frame body 410 as illustrated in FIG. 29. Then, the suction force generated by the suction pad 203 is released, the robot 200 moves upward and the suction pad 203 is separated from the cleaning member 420.

After the cleaning member 420 is assembled into the frame body 410, later-described various members are sequentially assembled in the same manner as that of the assembling operation of the cleaning member 420.

FIGS. 30 and 31 are perspective views of the photosensitive body assembly after the assembling operation as viewed from different view points from each other.

Here, a frame body 410, a photosensitive body 430, a photosensitive body holding body 440, a support plate 450, a rear cover 460, a front cover 470 and a charger 480 are illustrated as constituent parts of the photosensitive body assembly 400. The photosensitive body 430 corresponds to one of the photosensitive bodies 111Y, 111M, 111C and 111K illustrated in FIG. 22, and the charger 480 corresponds to one of the chargers 113Y, 113M, 113C and 113K illustrated in FIG. 22.

The cleaning member 420 (see FIG. 27 for example) which is first assembled into the frame body 410 is covered with the photosensitive body 430 and is not illustrated in FIGS. 30 and 31.

The photosensitive body holding body 440 and the support plate 450 support a rear end and a front end of the photosensitive body 430, respectively. The rear cover 460 and the front cover 470 cover a rear portion and a front portion of the photosensitive body assembly 400, respectively. The rear cover 460 is formed with an opening 461 for transmitting a rotation and driving force to the photosensitive body 430. A board 471 on which a memory for storing the number of cumulative rotation number of the photosensitive body 430 is fixed to the front cover 470.

Next, an assembling procedure of the parts included in the photosensitive body assembly 400 will be explained.

FIG. 32 illustrates the frame body 410.

In the drawings which are described below have marks for discriminating assembling steps as is described below, and the marks are omitted in the above explanation because they are unnecessary. These marks may be LEDs or retroreflectors which may clearly be shot by the camera 290 (see FIG. 23).

The frame body 410 illustrated in FIG. 32 is formed with a support plate discriminating mark 501, a cleaning member discriminating mark 502, a photosensitive body discriminating mark 503 and a charger discriminating mark 504.

FIG. 33 illustrates a state where the cleaning member 420 is assembled into the frame body 410.

Here, the cleaning member 420 is assembled into the frame body 410, the cleaning member discriminating mark 502 (see FIG. 32) is covered with the cleaning member 420, and it is possible to easily recognize that the cleaning member 420 is assembled into the frame body 410 by means of the camera 290 or eyes of an operator.

FIG. 34 illustrates a state where the photosensitive body 430 is further assembled.

By assembling the photosensitive body 430, the photosensitive body discriminating mark 503 (see FIG. 33) which may be seen until then is covered. With this, it is possible to easily recognize that the photosensitive body 430 is in the assembled state by the camera 290 or eyes of an operator. FIG. 35 illustrates a state where the photosensitive body holding body 440 is further assembled, and FIG. 36 is a partially enlarged perspective view of that state.

The photosensitive body holding body 440 is formed with the photosensitive body holding body discriminating mark 505 which is a new mark. It is recognized by the camera 290 or by the eyes of the operator that the photosensitive body holding body discriminating mark 505 is newly added in addition to the support plate discriminating mark 501 and the charger discriminating mark 504, thereby recognizing that the photosensitive body holding body 440 is in the assembled state.

FIG. 37 illustrates a state where the support plate 450 is assembled. FIG. 38 is a partially enlarged perspective view illustrating a state immediately before the support plate is assembled.

As illustrated in FIG. 38, the support plate 450 is assembled such that it is inserted from the front end of the photosensitive body 430 in the direction of the arrow E. Before the support plate 450 is assembled, the support plate discriminating mark 501 may be seen, but when the support plate 450 is assembled, the support plate discriminating mark 501 is covered. It is recognized by the camera 290 or the eyes of the operator that the support plate discriminating mark 501 is covered. With this, it is recognized that the support plate 450 is in the assembled state.

FIG. 39 illustrates a state where the rear cover 460 is further assembled. FIG. 40 is a partially enlarged perspective view of the state.

The rear cover 460 is formed with a rear cover discriminating mark 506 which is a new mark. It is recognized by the camera 290 or the eyes of the operator that the rear cover discriminating mark 506 is added and with this, it is easily recognized that the rear cover 460 is in the assembled state.

FIG. 41 illustrates a state where the front cover 470 is further assembled. FIG. 42 is a partially enlarged perspective view illustrating a state immediately before the front cover 470 is assembled.

As illustrated in FIG. 42, the front cover 470 is assembled into the support plate 450 such that the front cover 470 is pushed against the support plate 450 from front in the direction of the arrow F.

This front cover 470 is formed with a front cover discriminating mark 507 which is a new mark, and since the front cover discriminating mark 507 is newly added, it may easily be recognized by the camera 290 or the eyes of the operator that the front cover 470 is in the assembled state.

FIG. 43 illustrates a state where the charger 480 is further assembled.

When the charger 480 is assembled, the charger discriminating mark 504 is covered with the charger 480. With this, it is recognized by the camera 290 or the operator at a glance that the charger 480 is in the assembled state.

By forming the marks whose patterns are varied in accordance with assembling steps of the parts included in the photosensitive body assembly as described above, it is possible to easily recognize the assembling step at a glance by the camera or the operator.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A position/attitude recognizing method comprising:
   a first shooting process of shooting, by a camera, a group of light spots on an object-to-be-measured on which the group of light spots are arranged, the group of light spots including a plurality of light spots which are dispersed and disposed three-dimensionally to be disposed not on one plane; and
   a first recognizing process of recognizing a position and an attitude of the object-to-be-measured based on an optical image representing each of the plurality of light spots included in the group of light spots on a first shot image obtained by the shooting in the first shooting process, wherein the object-to-be-measured is an object in which a group of light spots including three first light spots arranged at mutually separated positions and one second light spot arranged at a position which is separated away in a perpendicular direction from a triangular reference surface whose apexes are respectively the three first light spots are arranged.

2. The position/attitude recognizing method according to claim 1, wherein the first shooting process is a shooting process in which the camera is arranged at a first position where a normal of the reference surface passing through the second light spot and a shooting optical axis do not match with each other, and the group of light spots on the object-to-be-measured is shot by the camera.

3. The position/attitude recognizing method according to claim 2, wherein the first shooting process is a shooting process in which the camera is arranged at the first position and in an attitude in which the camera is directed to the reference surface, and the group of light spots is shot by the camera.

4. The position/attitude recognizing method according to claim 2, wherein the first shooting process is a shooting process in which the camera is arranged at the first position and in an attitude in which the camera is directed in a direction parallel to the normal, and the group of light spots is shot by the camera.

5. The position/attitude recognizing method according to claim 2, further comprising:

a second shooting process in which the camera is arranged at a second position and the group of light spots is shot by the camera; and a second recognizing process of recognizing the position and the attitude of the object-to-be-measured based on an optical image representing the light spots included in the group of light spots on a second shot image obtained by the second shooting process, wherein the second shooting process and the second recognizing process are performed before shooting in the first shooting process, wherein the first shooting process is a shooting process in which the camera is moved to the first position where the normal of the reference surface passing through the second light spot and the shooting optical axis do not match with each other and where it is possible to perform shooting for recognizing more accurately than recognizing in the second recognizing process with respect to the position and the attitude of the object-to-be-measured, and the group of light spots may be shot by the camera.

6. A part holding method comprising:

a position/attitude recognizing process of recognizing a position and an attitude of the object-to-be-measured by the position/attitude recognizing method according to claim 1; and a part holding process of causing a robot which holds a part to a position to be right opposed to the part which is formed from the object-to-be-measured itself or which is arranged at a predetermined position and in an attitude relative to the object-to-be-measured, based on the position and the attitude of the object-to-be-measured recognized by the position/attitude recognizing process.

7. A part arranging method comprising:

a position/attitude recognizing process of recognizing a position and an attitude of the object-to-be-measured by the position/attitude recognizing method according to claim 1; and a part arranging process of causing a robot to hold a part, the robot being for arranging the part at a position and in an attitude both being relatively predetermined to the object-to-be-measured, causing the part to a position to be right opposed to the predetermined position and attitude based on the position and attitude of the object-to-be-measured recognized in the position/attitude recognizing process, and arranging the part at the predetermined position and attitude.

8. A part assembling method comprising:

a position/attitude recognizing process of recognizing a position and an attitude of the object-to-be-measured by the position/attitude recognizing method according to claim 1; and a part assembling process of causing a robot to hold a second part to be assembled to a first part, causing the second part to be right opposed to the first part which is formed from the object-to-be-measured itself or to the first part which is arranged at a predetermined position and in an attitude relative to the object-to-be-measured based on the position and the attitude of the object-to-be-measured recognized in the position/attitude recognizing process, and causing the robot to assemble the second part to the first part.

9. A position/attitude recognizing apparatus comprising:
a camera;
a camera control section that performs a first shooting process of causing the camera to shoot a group of light spots on an object-to-be-measured on which the group of light spots are arranged, the group of light spots including a plurality of light spots dispersed and disposed three dimensionally to be disposed not on one plane; and a position/attitude recognizing section that performs a first recognizing process of recognizing a position and an attitude of the object-to-be-measured based on an optical image representing each of the plurality of the light spots included in the group of light spots on a first shot image obtained by the shooting operation in the first shooting process, wherein the object-to-be-measured is an object in which a group of light spots including three first light spots disposed at mutually separated positions and one second light spot arranged at a position being separated away in a perpendicular direction from a triangular reference surface whose apexes are respectively the three first light spots are arranged.

10. The position/attitude recognizing apparatus according to claim 9, wherein
the camera is a camera which is arranged at a first position where a normal of the reference surface passing through the second light spot and a shooting optical axis do not match with each other.

11. The position/attitude recognizing apparatus according to claim 10, wherein the camera is a camera which is arranged at the first position and in an attitude in which the camera is directed to the reference surface.

12. The position/attitude recognizing apparatus according to claim 10, wherein the camera is arranged at the first position and in an attitude in which the camera is directed in a direction parallel to the normal.

13. The position/attitude recognizing apparatus according to claim 9, wherein
the camera is a camera whose position and attitude of the camera may be changed,
the camera control section arranges the camera in a second position before the shooting in the first shooting process and performs a second shooting process of causing the camera being in the second position to shoot the group of light spots by,
the position/attitude recognizing section performs a second recognizing process of recognizing a position and an attitude of the object-to-be-measured based on an optical image representing light spots included in the group of light spots on a second shot image obtained in the second shooting process, and
the camera control section moves the camera to the first position where the normal of the reference surface passing through the second light spot and the shooting optical axis do not match with each other and where it is possible to perform shooting for recognizing more accurately than recognizing in the second recognizing process with respect to the position and the attitude of the object-to-be-measured, and causes the camera to shoot the group of light spots.

14. The position/attitude recognizing apparatus according to claim 9, wherein the camera and the robot are fixed to each other, and the positions and the attitudes of the camera and the robot may be changed only integrally.

15. The position/attitude recognizing apparatus according to claim 9, wherein the positions and the attitudes of the camera and the robot may be changed independently from each other.

16. The position/attitude recognizing apparatus according to claim 9, wherein the light spot is a light-emitting diode.

17. The position/attitude recognizing apparatus according to claim 9, wherein the light spot is a retroreflector which reflects incident light in an incident direction.

18. A part holding apparatus comprising:
the position/attitude recognizing apparatus according to claim 9;
a robot to hold a part which is formed from the object-to-be-measured itself or which is arranged at a predetermined position and in a predetermined attitude relative to the object-to-be-measured; and
a robot control section that causes the robot to be right opposed to the part based on the position and the attitude of the object-to-be-measured recognized in the position/attitude recognizing process, and to hold the part.

19. A part arranging apparatus comprising:
the position/attitude recognizing apparatus according to claim 9;
a robot that holds a part, and arranges the held part at a predetermined position and in a predetermined attitude relative to the object-to-be-measured; and
a robot control section that causes the robot to hold the part, causes the part to be right opposed to the predetermined position and attitude based on the position and attitude of the object-to-be-measured recognized by the position/attitude recognizing apparatus, and arranges the part at the predetermined position and in the predetermined attitude.

20. A part assembling apparatus comprising:
the position/attitude recognizing apparatus according to claim 9;
a robot that holds a second part to be assembled to a first part and assembles the held second part to the first part, and
a robot control section that causes the robot to hold the second part, causes the second part to be right opposed to the first part which is formed from the object-to-be-measured itself or to the first part which is arranged at a predetermined position and in an attitude relative to the object-to-be-measured based on the position and attitude of the object-to-be-measured recognized by the position/attitude recognizing apparatus, and causes the robot to assemble the second part to the first part.

* * * * *